United States Patent [19]
Furuichi et al.

[11] Patent Number: 5,531,290
[45] Date of Patent: Jul. 2, 1996

[54] SAFETY APPARATUS FOR FUEL TANK

[75] Inventors: Kenji Furuichi, Tokyo; Moritaka Gotoh, Chiba, both of Japan

[73] Assignee: Fujikura Ltd., Tokyo, Japan

[21] Appl. No.: 103,525

[22] Filed: Aug. 9, 1993

[30] Foreign Application Priority Data

| Aug. 10, 1992 | [JP] | Japan | 4-213041 |
| Aug. 10, 1992 | [JP] | Japan | 4-213042 |
| Dec. 16, 1992 | [JP] | Japan | 4-336409 |

[51] Int. Cl.$^6$ .......................... B60K 28/10; B60R 21/00
[52] U.S. Cl. .......................... 180/271; 180/274; 340/436; 340/440; 340/449; 250/227.15; 250/227.16; 200/61.45 R
[58] Field of Search .......................... 280/735; 180/274, 180/282, 284, 271; 220/88.1, 562; 340/436, 440, 449, 665; 250/227.15, 227.16; 200/61.44, 61.45 R, 61.52

[56] References Cited

U.S. PATENT DOCUMENTS

| 3,859,482 | 1/1975 | Matsui et al. | 340/436 |
| 3,876,011 | 4/1975 | Poitras | 169/57 |
| 3,905,015 | 9/1975 | Inose et al. | 180/274 |
| 4,262,749 | 4/1981 | Monte . | |
| 4,349,809 | 9/1982 | Tomes | 340/440 |
| 4,633,967 | 1/1987 | Kranz | 180/274 |
| 4,802,548 | 2/1989 | Kausch | 180/274 |
| 4,930,852 | 6/1990 | Wheeler et al. . | |
| 4,988,862 | 1/1991 | Beltz | 280/735 |
| 4,995,639 | 2/1991 | Breed | 180/274 |
| 4,999,141 | 3/1991 | Ueno et al. | 264/1.4 |
| 5,260,520 | 11/1993 | Muhs et al. | 177/210 R |
| 5,267,995 | 12/1993 | Doiron et al. | 606/15 |
| 5,335,749 | 8/1994 | Taguchi et al. | 180/274 |

FOREIGN PATENT DOCUMENTS

| 2553356 | 4/1985 | France . | |
| 2654941 | 5/1991 | France . | |
| 2305763 | 8/1973 | German Dem. Rep. . | |
| 3116867 | 11/1982 | German Dem. Rep. . | |
| 3802527 | 8/1988 | German Dem. Rep. . | |
| 61-28529 | 7/1986 | Japan | 180/274 |
| 2215685 | 9/1989 | United Kingdom . | |

OTHER PUBLICATIONS

JP 58224833, Title: Crash Protective Unit for Car, Yamaguchi Akio, vol. 8, No. 80 (M–289), Apr. 12, 1984 Patentee: Yazaki Sougiyou KK.

JP 57074217, Title: Device for Preventing Ignition in Inflammable Substance Tank, Suzuki Yoshioki et al., vol. 6, No. 157 (M–150), Aug. 18, 1982, Patentee: Miyata Kogyo KK.

JP 57074215, Title: Ignition Preventive Device for Inflammable Liquid Tank, Suzuki Yoshioki et al., vol. 6, No. 157 (M–150), Aug. 18, 1982 Applicant: Miyata Kogyo KK.

*Primary Examiner*—Paul N. Dickson
*Attorney, Agent, or Firm*—Oblon, Spivak, McClelland, Maier & Neustadt

[57] ABSTRACT

A safety apparatus for a fuel tank in a vehicle includes a fuel tank for storing fuel, a gelling agent tank for storing a gelling agent which can gelatinize the fuel, a supply system for supplying the gelling agent in the gelling agent tank to the fuel tank, a tank-emergency detecting system for detecting an emergency in the fuel tank, and a control system for outputting a drive signal to drive the supply system. The control system outputs the drive signal under the condition that the tank-emergency detecting system outputs an emergency detection signal indicating an emergency in the fuel tank.

11 Claims, 12 Drawing Sheets

FIG.10

| 9 X | 10 X | 12 X | 6 X |
|---|---|---|---|
| 1 | 0 | 0 | 1 |
| 0 | 1 | 0 | 1 |
| 0 | 0 | 1 | 1 |
| 1 | 1 | 0 | 1 |
| 1 | 0 | 1 | 1 |
| 0 | 1 | 1 | 1 |
| 1 | 1 | 1 | 1 |
| 0 | 0 | 0 | 0 |

FIG.11

| 11 Z | 12 Y | 6 X |
|---|---|---|
| 1 | 0 | 0 |
| 0 | 1 | 0 |
| 0 | 0 | 0 |
| 1 | 1 | 1 |

FIG.12

| 11 Z | 9 Y | 6 X |
|---|---|---|
| 0 | 0 | 0 |
| 1 | 0 | 0 |
| 0 | 1 | 0 |
| 1 | 1 | 1 |

| 114X | 119X | 117X | 116X |
|------|------|------|------|
| 0 | 0 | 0 | 0 |
| 1 | 1 | 0 | 0 |
| 1 | 1 | 1 | 0 |
| 1 | 1 | 1 | 1 |
| 1 | 0 | 1 | 0 |
| 1 | 0 | 1 | 1 |
| 1 | 0 | 0 | 1 |
| 1 | 1 | 0 | 1 |

| 114X | 119X | 117X | 116X |
|------|------|------|------|
| 0 | 0 | 0 | 0 |
| 1 | 1 | 0 | 0 |
| 1 | 1 | 1 | 0 |
| 1 | 1 | 1 | 1 |
| 1 | 0 | 1 | 0 |
| 1 | 0 | 1 | 1 |
| 0 | 0 | 0 | 1 |
| 1 | 1 | 0 | 1 |

SAFETY APPARATUS FOR FUEL TANK

BACKGROUND OF THE INVENTION

1. Field of the Invention

The present invention relates to a safety apparatus for a fuel tank in a vehicle or the like, which can prevent outflow of flammable liquid, e.g., gasoline, light oil or the like which is stored in the fuel tank, caused by an accident such as a vehicle collision, rollover or the like.

2. Discussion of the Background

Conventionally, a fire prevention apparatus of a tank for a flammable fuel is known, such as a kind of safety apparatus for a fuel tank, as shown in Japanese Patent Application Kokoku (Post-Exam) Publication No. Sho 61-28529.

The fire prevention apparatus described in this publication comprises an impact sensing mechanism for sensing the impact caused by a crash of the vehicle to output a detection signal, a gelling agent tank for storing a gelling agent which can gelatinize a flammable liquid, and a forcing mechanism for forcing the gelling agent in the gelling agent tank into the fuel tank according to the detection signal of the impact sensing mechanism.

The fire prevention apparatus for the fuel tank having the above-described structure forces a flammable fluid in the gelling agent tank into the fuel tank when the vehicle crashes.

U.S. Pat. No. 3,876,011 discloses a safety apparatus for extinguishing fires in vehicles. The fire prevention apparatus described in this publication comprises a mechanical impact sensing mechanism for sensing the impact caused by a crash of the vehicle, an extinguishing agent tank for storing an extinguishing agent which can extinguish a fire, and a mechanical forcing mechanism for forcing the extinguishing agent into the fuel tank by using a valve which is opened by the force of the impact.

Each of the fire prevention apparatuses described in the references uses an acceleration sensing mechanism for sensing an impact caused by a vehicle crash. Although such acceleration sensors can detect the crash of the vehicle, than cannot detect whether the fuel tank is largely damaged by the impact given to the fuel tank, or not. Consequently, according to conventional fire prevention apparatuses for the fuel tank, there is a serious problem in that the gelling or extinguishing agent may be supplied into the fuel tank even though no emergency is occurring to the fuel tank.

U.S. Pat. No. 4,633,967 discloses a safety apparatus for extinguishing fires in vehicles. The fire prevention apparatus described in this publication comprises a mechanical impact sensing mechanism for sensing the impact in only the horizontal directions received by the fuel tank of the vehicle, an extinguishing agent tank for storing an extinguishing agent which can extinguish a fire, and a mechanical supplying mechanism for supplying the extinguishing agent into the fuel tank by using a valve which is mechanically opened by the force of the impact.

However, the reference does not disclose a method which can prevent a fire by gelatinizing the fuel in the fuel tank by forcing a gelling agent into the fuel tank. The fire prevention apparatus shown in the reference can detect the impact in only the four horizontal directions; however, it cannot detect the impact in the two vertical directions. Such an impact in one of the vertical directions is a serious matter with respect to the fire prevention in a vehicle because impacts in the vertical directions often cause fire or an explosion following extensive damage suck as a crack to the fuel tank. For example, when the vehicle runs onto the sidewalk, when a tire is released from the vehicle, after a crash, or when the fuel tank is extensively damaged by some projection, or the like.

There sometimes are various signs indicating danger of a vehicle collision, before a serious accident such as a collision actually occurs. It has been desired to provide an apparatus for previously detecting such signs to prevent occurrence of accidents, as soon as possible.

SUMMARY OF THE INVENTION

The present invention was developed in view of the above-described circumstances.

An object of the present invention is to provide a safety apparatus for a fuel tank of a vehicle which can prevent the occurrence of problem, prior to an accident by monitoring the state of the fuel tank through an emergency detection sensor and by using output from the sensor.

Another object of the present invention is to provide a safety apparatus for a fuel tank of a vehicle which can surely detect whether or not the fuel tank is largely damaged by the impact on the fuel tank, in order to prevent supply of the gelling agent into the fuel tank when no emergency occurs.

A further object of the present invention is to provide a safety apparatus for a fuel tank of a vehicle which is simple and low in cost, and which can accurately detect the emergency which occurs on the fuel tank by external forces such as impacts and can detect the nature of the emergency.

In order to achieve the above-mentioned objects, the safety apparatus for a fuel tank of the present invention comprises: a fuel tank for storing fuel; a gelling agent tank for storing a gelling agent which can gelatinize the fuel; a supply system for supplying the gelling agent in the gelling agent tank into the fuel tank; a tank-emergency detecting means for detecting an emergency in the fuel tank; and a control means for outputting a drive signal to drive the supply system; wherein the control means outputs the drive signal, under the condition that the tank-emergency detecting means outputs an emergency detection signal indicating an emergency in the fuel tank.

According to the present invention, when the emergency detecting means detects an extraordinary state of the fuel tank in a vehicle such as the occurrence of a crack, gelling agent is supplied into the fuel tank to gelatinize the fuel. Consequently, it is possible to previously prevent occurrence of accidents, e.g., the outbreak or spread of fire in the vehicle. Supply of the gelling agent into the fuel tank can be not carried out, when no serious emergency occurs in the fuel tank even if a large impact is given to the vehicle, so long as no serious emergency occurs at other main detecting positions.

Preferably, the emergency detecting means comprises: an electrically conductive line member provided on the wall surface of the fuel tank and a judgement means for outputting an emergency detection signal indicating an emergency in the fuel tank when the conductive line member is disconnected.

According to this structure, when the fuel tank is cracked, and at the same time, the conductive line member provided on the wall surface of the fuel tank is disconnected, the voltage applied to the other terminal of the conductive line member decreases to less than a predetermined threshold value of voltage, so that the judgement means outputs a tank-emergency detection signal showing an emergency in the fuel tank. Consequently, it is possible to surely detect the deformation of the fuel tank caused by external force, according to the emergency detection signal.

Preferably, the emergency detecting means in the safety apparatus of the fuel tank of the present invention comprises; an optical fiber provided on the fuel tank or an attached component thereof, a light supply means for supplying a predetermined quantity of light to the optical fiber, and a light quantity detecting means for detecting the quantity of the light which was transmitted from the light supply means through the optical fiber, wherein the light quantity detecting means measures change of quantity of light to the ordinary quantity of light which is one when the fuel tank receives substantially no large external forces, and detects an emergency in the fuel tank on the basis of the results of the measurement.

According to the structure, since the quantity of light transmitted through the optical fiber is changed according to the magnitude of the external force applied to the fuel tank, the light quantity detecting means can output a tank-emergency detection signal showing an emergency in the fuel tank when a large external force is applied to the optical fiber provided on the fuel tank. Therefore, it is possible to surely detect occurrence of an emergency on the fuel tank caused by external forces by using the tank-emergency detection signal.

Preferably, the attached optical fiber has a good flexibility and the transmission quantity thereof changes according to external force given to the optical fiber. Accordingly, it is possible to sensitively transmit the external force applied to the fuel tank.

Preferably, the safety apparatus further comprises a plurality of emergency detection means such as a temperature-emergency detection means which monitors the temperature in the fuel tank and outputs an emergency detection signal when the temperature in the fuel tank exceeds a predetermined threshold temperature; an acceleration-emergency detection means which detects acceleration (including deceleration) of the vehicle and outputs an emergency detection signal when the acceleration of the vehicle exceeds a predetermined threshold value of acceleration; and the control means outputs the drive signal, under the condition that at least one of the plurality of emergency detection means outputs an emergency detection signal.

According to the structure, it is possible to effectively cope with various emergencies in the vehicle.

Preferably, the safety apparatus further comprises a temperature-emergency detection means which monitors the temperature in the fuel tank and outputs an emergency detection signal when the temperature in the fuel tank exceeds a predetermined threshold value of temperature; an acceleration-emergency detection means which detects acceleration of the vehicle and which outputs an emergency detection signal when the acceleration of the vehicle exceeds a first predetermined threshold value of acceleration, and outputs an emergency supplement signal when the acceleration of the vehicle exceeds a second predetermined threshold value of acceleration less than the first predetermined threshold value of acceleration; and a tilt-emergency detection means detects the tilt angle of the vehicle and outputs an emergency tendency signal when the tilt angle exceeds a predetermined threshold value of the tilt angle; and the light quantity detecting means outputs an emergency detection signal when the ratio of the detected light quantity to the ordinary light quantity which is one when the fuel tank receives substantially no large external forces, is less than a first predetermined threshold value of light quantity ratio, and outputs an emergency supplemental signal when the ratio of the detected light quantity to the ordinary light quantity is less than the second predetermined threshold value of light quantity ratio which is more than the first predetermined threshold value of light quantity ratio; and the control means outputs the drive signal, under the condition that at least one of the tank-emergency detection means, the temperature-emergency detection means, and the acceleration-emergency detection means outputs an extraordinary detection signal; and outputs the drive signal to the supply system, under the condition that both of at least one of the emergency supplemental signal and the emergency tendency signal are outputted at the same time.

According to this structure, not only when an extraordinary deformation or a crack of the fuel tank occurs by a crash or the like, but also when an extraordinary temperature rise in the fuel tank, a serious extraordinary acceleration of the vehicle, or a combination of emergencies occurs, it is possible to supply gelling agent into the fuel tank to gelatinize the fuel. It is thereby possible to effectively cope with various emergencies in the vehicle.

BRIEF DESCRIPTION OF THE DRAWINGS

FIG. 10 is a truth table showing the relationship between the input and the output of an OR gate in a control means in the safety apparatus for a fuel tank according to the first embodiment.

FIG. 11 is a table of truth values showing the relationship between the input and the output of a first AND gate in a control means in the safety apparatus for a fuel tank according to the first embodiment.

FIG. 12 is a table of truth values showing the relationship between the input and the output of a second AND gate in a control means in the safety apparatus for a fuel tank according to the first embodiment.

DESCRIPTION OF THE PREFERRED EMBODIMENTS

Hereinafter, a first embodiment of the safety apparatus for a fuel tank in a vehicle of the present invention will be explained with reference to FIGS. 1–12.

Figure 1:
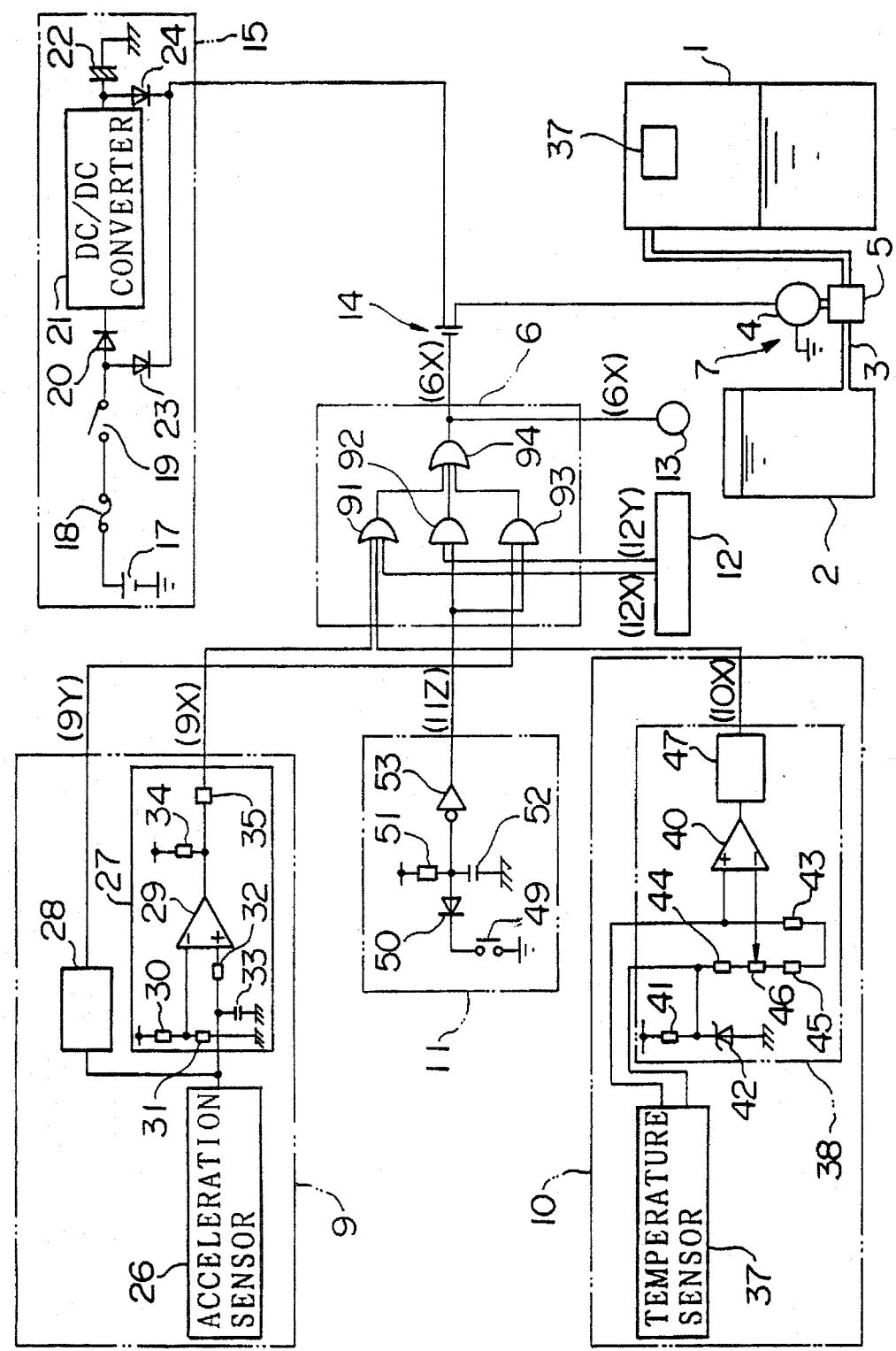
FIG. 1 is a general circuit diagram showing the safety apparatus for a fuel tank in a vehicle according to a first embodiment of the present invention.

In FIG. 1, numeral 1 denotes a fuel tank for storing flammable liquid such as gasoline, light oil or the like, mounted on the vehicle. The fuel tank 1 is connected to a gelling agent tank 2 for storing a gelling agent to gelatinize the flammable liquid through a pipe 3.

As a gelling agent stored in the gelling agent tank 2, an oil gelling agent, e.g., an oil gelling agent comprising N-lauroyl-L-glutamic acid-$\alpha,\gamma$-di-n-butylamide as the chief ingredient, which is disclosed in Japanese Patent Application Kokoku (Post-Exam) Publication No. Sho 58-29133, or a gelling agent obtained by dissolving 15 weight of powder of sorbitol with benzaldehyde, i.e., mono-, di-, or tri-benzylidene sorbitol, in N.N-dimetylacetamide, which is disclosed in Japanese Patent Application Kokoku (Post-Exam) Publication No. Sho 61-28529, or the like, may be used. A mixture of a gelling agent and an extinguishing agent also may be used.

In the middle of the pipe 3 connecting the fuel tank 1 and the gelling agent tank 2, a pump 5 for supplying a gelling agent from the gelling agent tank 2 into the fuel tank 1 by driving a motor 4, is provided. The drive of the motor 4, i.e., the drive of the pump 4, is controlled by a control means 6.

To the control means 6, an acceleration-emergency detection means 9, a temperature-emergency detection means 10, a tilt-emergency detection means 11, a tank-emergency detection means 12, a fuel pump control module 13, and a field effect transistor (a FET) 14 are connected. A switching element, e.g., a power transistor or the like, may be used instead of the FET 14. Both the power supply circuit 15 for supplying a driving power to the motor 4 and the motor 4 are connected to the control means 6 through the FET 14. In this specification, the term of "acceleration" means acceleration or deceleration.

The power supply circuit 15 comprises a battery 17 which has a grounded terminal, a fuse 18, an ignition key switch 19, a diode 20 for a bypass, a DC-to-DC converter 21, and a capacitor 22 which has a grounded terminal, which are connected in series to one another. The terminal of the diode 20 in the side of the ignition key switch is connected to the drain of the FET 14 through a diode 23 for a bypass. The terminal of the capacitor 22 having the grounded terminal in the side of the DC-to-DC converter 21 is also connected to the drain of the FET 14 through a diode 24 for a bypass. When the ignition key switch 19 is ON, and an output of driving signal with a "high" level from the control means 6 is applied to the gate of the FET 14, the FET 14 becomes ON to supply driving power from the power supply circuit 15 to the motor 4.

The DC-to-DC converter 21 is for supplying an appropriate driving power to the motor 4 by raising the voltage from the battery 17 when the voltage of the battery 17 becomes less than a predetermined value. The capacitor 22 is for supplying driving power to the motor 4 when the wiring from the battery 17 is disconnected. The supply system 7 comprises the motor 4, the pump 5, the FET 14, and the power supply circuit 15.

The acceleration-emergency detection means 9 comprises an acceleration sensor 26 which detects acceleration and changes the detected accelerations to electric signals to output; and first and second acceleration comparison judgement circuits 27 and 28.

For example, the acceleration sensor 26 is attached in the vicinity of the center console which is positioned at approximately the center of the vehicle. The acceleration sensor 26 has a structure which can detect omnidirectional accelerations, i.e., accelerations in the directions toward the front, toward the rear, toward the left, and toward the right by only one acceleration sensor. Four acceleration sensors, each of which can detect an acceleration in only one direction, may be used in order to detect accelerations in the directions toward the front, toward the rear, toward the left, and toward the right. Two acceleration sensors, each of which can detect accelerations in two directions toward the front and toward the rear, or in two directions toward the left and the right, may be used.

Each of the first and second acceleration comparison judgement circuits 27 and 28 has approximately the same construction. Each of them comprises a comparator (an operational amplifier) 29, resistors 30 and 31 for setting the voltage of the negative (−) input terminal of the comparator 29 by dividing a voltage, a resistor 32 for protecting input of the comparator 29, a capacitor 33 for absorbing noises, a resistor 34 for pull-up, and a resistor 35 for protecting output of the comparator. The acceleration sensor 26 is connected to the positive (+) input terminal of comparator 29 through the resistor 32. The input terminal of the resistor 32 is connected to the ground through the capacitor 33. The resistors 30 and 31 are connected in series. A predetermined constant voltage is applied to one terminal of the resistor 30. The other terminal of the resistor 30 and one terminal of the resistor 31 are connected to the negative input terminal of the comparator 29. The other terminal of the resistor 31 is grounded. The output terminal of the comparator 29 is connected to the control means 6 through the resistor 35. One terminal of the resistor 34 for pull-up is connected to the output terminal of the comparator 29, and a predetermined voltage is applied to the other terminal of the resistor 34.

In each acceleration comparison judgement circuit 27 or 28, the comparator 29 outputs a signal with a low level "0" when the voltage of the positive input terminal of the comparator 29 is lower than that of the negative input terminal thereof. The comparator 29 outputs a signal with a high level "1" when the voltage of the positive input terminal of the comparator 29 is higher than that of the negative input terminal. That is, when the voltage of the acceleration sensor side is higher than that of the negative input terminal side which is set by the resistors 30 and 31, the signal with a high level "1" is outputted.

The resistance values of the resistors 30 and 31 in each of the first and second acceleration comparison judgement circuits 27 and 28 are set, so that the first acceleration comparison judgement circuit 27 outputs an emergency detection signal with a high level to the control means 6 when an acceleration of the vehicle in any direction exceeds a first predetermined acceleration threshold value, and the second acceleration comparison judgement circuit 28 outputs an emergency supplemental signal with a high level to the control means 6 when an acceleration of the vehicle in any directions exceeds a second predetermined acceleration threshold value which is less than the first predetermined acceleration threshold value.

The first predetermined acceleration threshold value is generally set to an acceleration which operates an air bag in the vehicle to open, e.g., about 2.3 G, 2.0 G or the like, wherein G is the gravitational acceleration. The first predetermined acceleration threshold value is generally set to an acceleration which can result in collisions and which cannot result from ordinary braking operations.

The temperature-emergency detection means 10 comprises a temperature sensor 37 which detects the temperature in the fuel tank 1 and changes the detected temperature to electric signals to output, and a temperature comparison judgement circuit 38. The temperature sensor 37 is attached at a predetermined upper position of inner wall surface of the fuel tank 1, and detects the temperature at the position, for example, by change of the resistance value of a thermistor. The higher the temperature is, the larger the resistance value of the thermistor is. A thermo-couple having a good response property may be used as the temperature sensor. A fire sensor may be attached to an outside portion of the fuel tank 1.

The temperature comparison judgement circuit 38 comprises an OP AMP (operational amplifier) 40, a resistor 41 for setting a reference voltage, a Zener diode 42, a resister 43 for linearizing the resistance value of the thermistor, resistors 44 and 45 and a variable resistor 46 which adjust the output of the OP AMP 40 to 0 when the detected temperature by the thermistor is 0° C., a variable resistor 46, and a comparison judgement circuit 47. The temperature sensor 37, and the resistors 44, 46, 45 and 43 form a circuit. One terminal of the temperature sensor 37 is connected to the input positive terminal of the OP AMP 40. The other terminal of the temperature sensor 37 is connected to the resistors 44, 46, 45 and 43 in series in the order named. The output terminal of the variable resistor 46 is connected to the input negative terminal of the OP AMP 40. A predetermined constant voltage is applied to one terminal of the resistor 41. The other terminal of the resistor 41 and one terminal of the Zener diode 42 are connected to the terminal of the temperature sensor 37. The other terminal of the Zener diode 42 is grounded.

The OP AMP 40 amplifies the difference between the voltages of the positive and negative input terminals of the OP AMP 40 and outputs the amplified voltage into the comparison judgement circuit 47. The comparison judgement circuit 47 has approximately the same construction as that of the acceleration comparison judgement circuit 27. The resistance values of resistors 30 and 31 in the temperature comparison judgement circuits 27 are set so that the temperature comparison judgement circuit 27 outputs an emergency detection signal with a high level to the control means when the temperature detected by the temperature sensor 37 exceeds a predetermined temperature threshold value. The predetermined temperature threshold value is set near the flash point of the flammable liquid in the fuel tank 1. For example, the flash points of light oil and gasoline are about 257° C. and about 300° C. respectively.

The tilt-emergency detection means 11 comprises a tilt sensor 49 of a switch type which turns ON when the tilt angle of the vehicle exceeds a predetermined tilt angle threshold value, a diode 50 for protecting input, a resistor 51 for pull-up, a capacitor 52 for absorbing noises, and an inverter 53. One terminal of the tilt sensor 49 is grounded, and the other terminal thereof is connected to the input terminal of the inverter 53 through the diode 50. The tilt sensor 49 comprises a pair of electrodes and a small quantity of mercury which are provided in a container. The tilt sensor 49 has a structure so that the mercury moves to short-circuit the pair of electrodes when the container is tilted at an angle larger than a predetermined angle. The input terminal of the inverter 53 is connected to a terminal of the resistor 53 having the other terminal to which a predetermined constant voltage is applied, and is connected to a terminal of the capacitor 52 which has the other grounded terminal. When the tilt sensor 11 turned ON, a signal with a low level is inputted into the inverter 53. The signal with a low level is inverted through the inverter 53, so that an emergency tendency signal 11Z with a high level is outputted to the control means 6. The tilt sensor 11, for example, is provided on an upper portion of the fuel tank 1. The tilt angle threshold value to make the state of the tilt sensor 11 ON, for example, is set at 90°, which indicates a rollover state of the vehicle.

Figure 2:
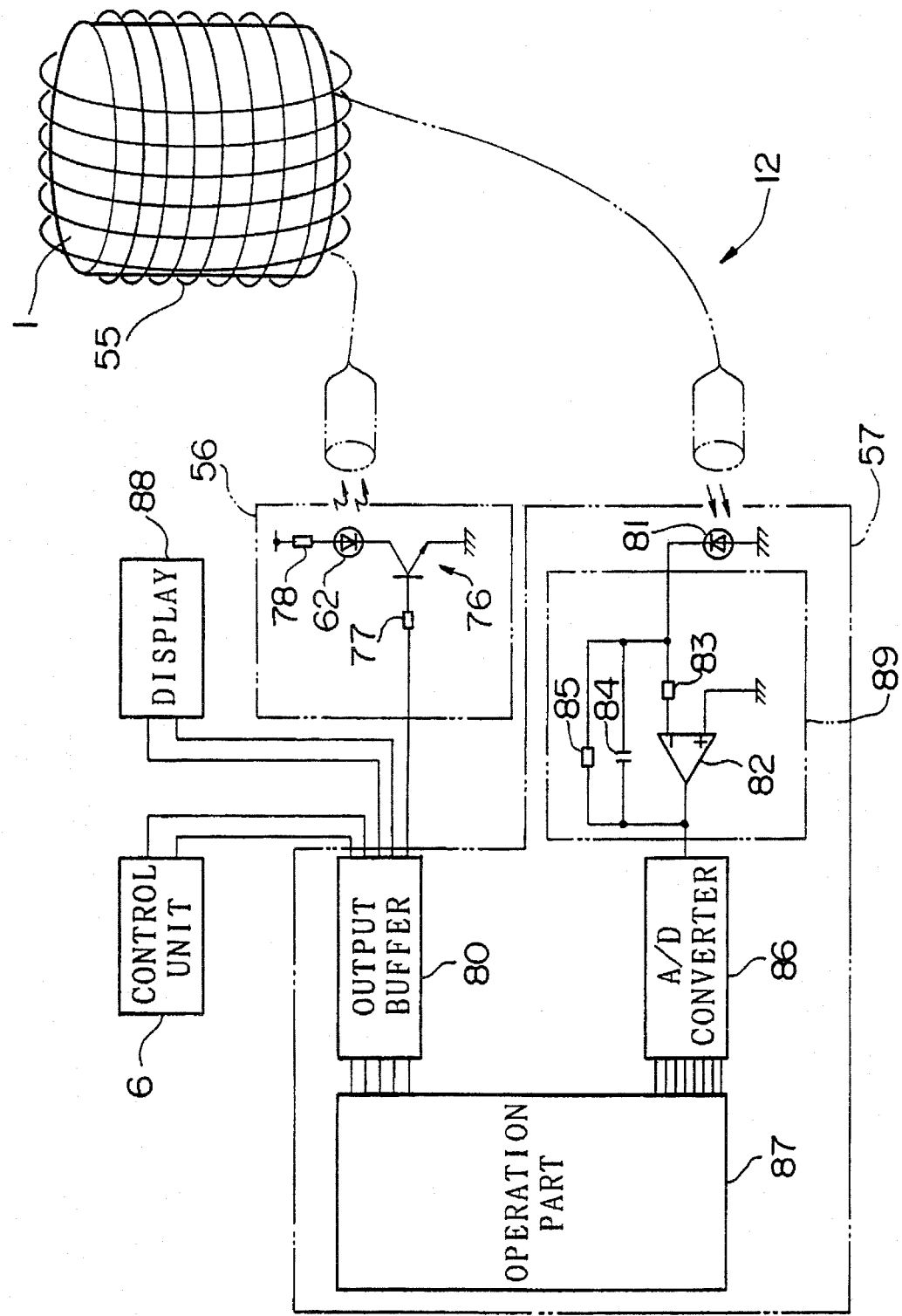
FIG. 2 is a circuit diagram showing a tank-emergency detection means in the safety apparatus for a fuel tank according to the first embodiment.

The tank-emergency detection means 12 in the first embodiment of the present invention comprises a rubber optical fiber 55 provided on the fuel tank 1 or an attached component thereof, a light supply means 56 for supplying a predetermined quantity of light to the optical fiber 55, and a light quantity detecting means 57 for detecting the quantity of the light which was transmitted from the light supply means 56 through the optical fiber 55, as shown in FIG. 2.

Figure 3:
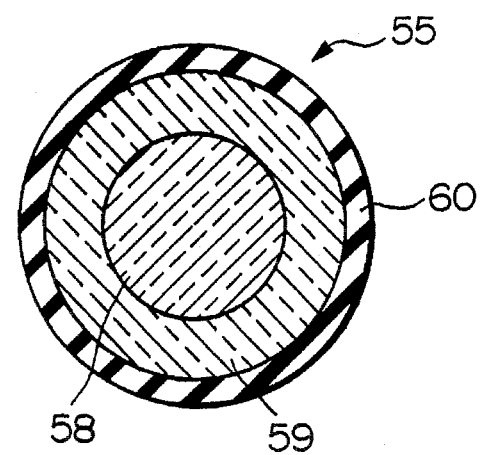
FIG. 3 is a sectional view showing a rubber optical fiber in the safety apparatus for a fuel tank according to the first embodiment.

The rubber optical fiber 55 comprises a three-layer structure of a core 58, a cladding layer 59, and a coating material layer 60, as shown in FIG. 3. Since each of the core 58, the cladding layer 59, and the coating material layer 60 is made of a rubber material, the rubber optical fiber 55 has a good flexibility. For example, a transparent silicone rubber having a high refractive index, a transparent silicone rubber having a low refractive index, and a fluorocarbon rubber may be used for the core 58, the cladding layer 59, and the coating material layer 60, respectively.

The rubber optical fiber 55 is easily deformed by external forces because of its rubber elasticity. Therefore, the quantity of light transmitted through the optical fiber 55 changes according to external forces, thereby the rubber optical fiber 55 can function as a sensing member for external forces. An example of the characteristics of the rubber optical fiber 55 in response to magnitude of external forces is shown in FIG.

Figure 4:
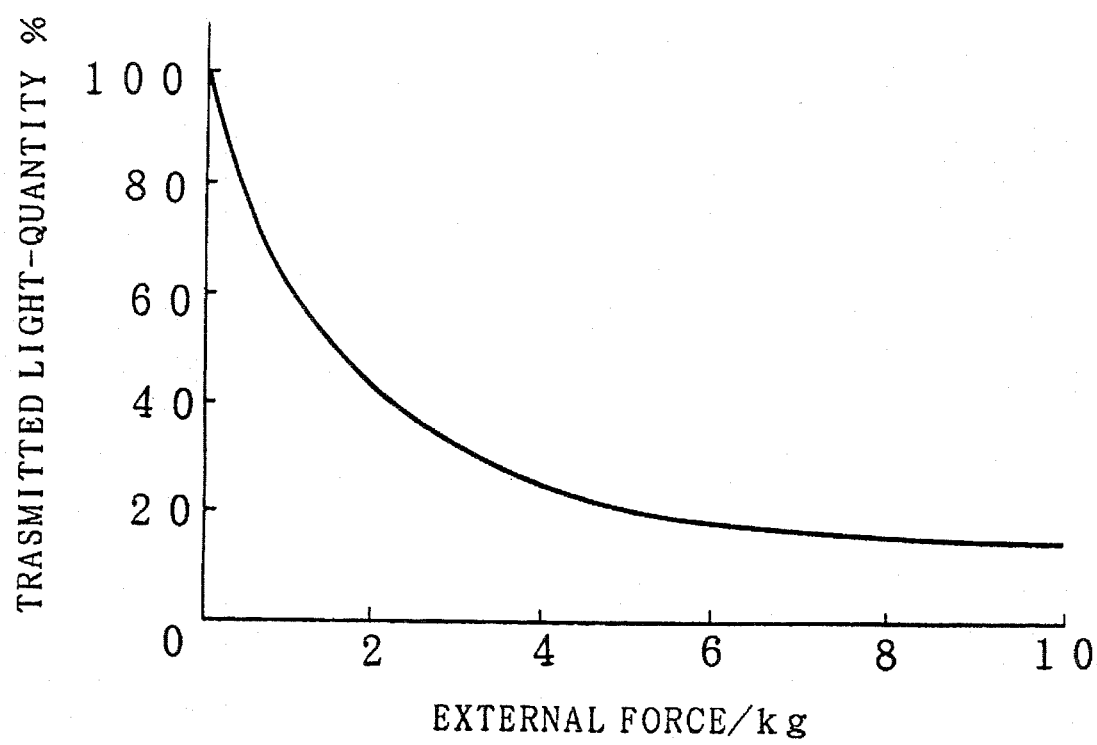
FIG. 4 is a graph showing a characteristic of a rubber optical fiber in the safety apparatus for a fuel tank according to the first embodiment.

4. This figure shows the change of transmitted light quantity when pressures are applied to the rubber optical fiber 55 by using a metal plate 1 centimeters square. The relationship between transmitted light quantity of the rubber optical fiber 55 and external forces is shown in this figure by using change of the light quantity, as shown in FIG. 4, wherein the rate of the transmitted light quantity is 100% when no external forces are applied to the rubber optical fiber 55. For example, when an external force of 10 kg is applied to the rubber optical fiber 55, the transmitted light quantity decreases to 20% of the ordinary light quantity. When the rubber optical fiber 55 snaps, the transmitted light quantity becomes very small or approximately zero.

The rubber optical fiber 55 is wound around the entirety of the fuel tank 1 at a constant pitch. One end of the rubber optical fiber 55 is connected to a light emitting diode for supplying a predetermined quantity of light into the rubber optical fiber 55.

Figure 5:
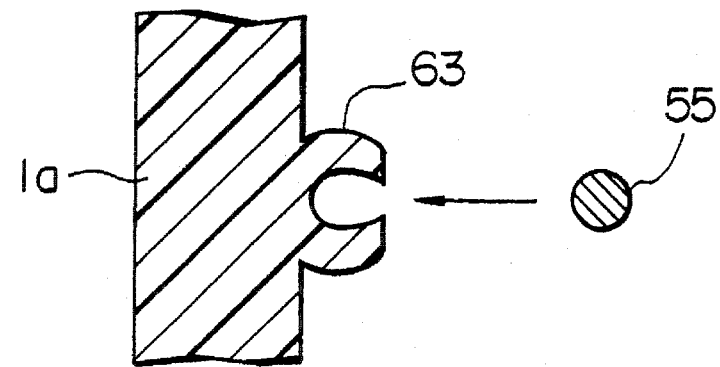
FIG. 5 is a partially sectional view showing a fuel tank and an optical fiber in the safety apparatus for a fuel tank according to the first embodiment.

In the case of the fuel tank 1 made of a plastic, a long plastic attachment 63 having a cross sectional shape which is approximately a ring with a part cut off a part therefrom, is continuously formed around the outside wall of the fuel tank 1 in a body, as shown in FIG. 5. The rubber optical fiber 55 is supported on the fuel tank 1 by insertion in the attachment 63.

Figure 6:
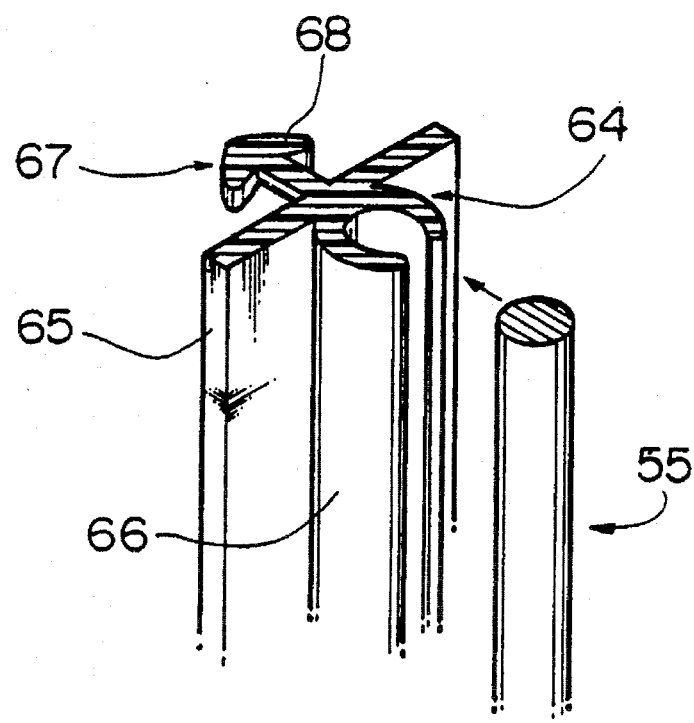
FIG. 6 is a perspective view showing an optical fiber and an attaching member in the safety apparatus for a fuel tank according to the first embodiment.
Figure 7:
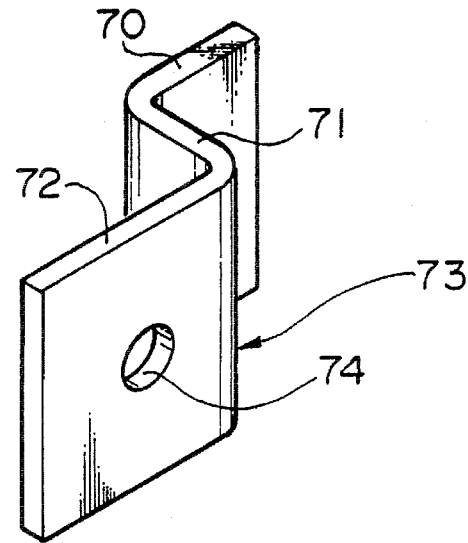
FIG. 7 is a perspective view showing a supporting member for attaching the attaching member to the fuel tank in the safety apparatus of the fuel tank according to the first embodiment.
Figure 8:
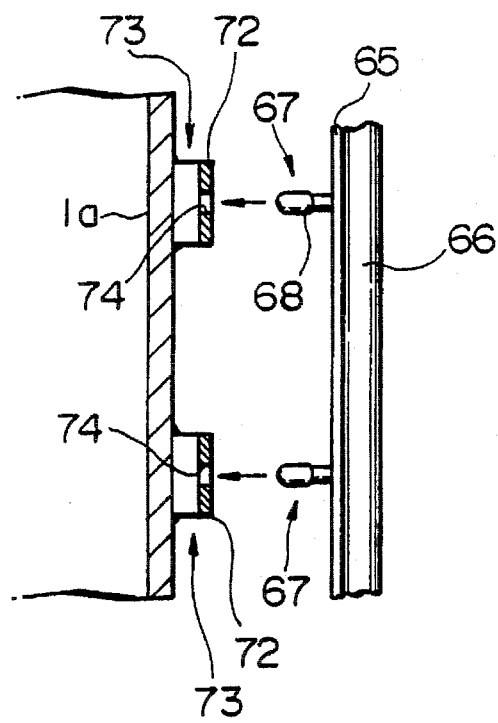
FIG. 8 is a partially sectional view showing the attaching member and the fuel tank in the safety apparatus of the fuel tank according to the first embodiment.
Figure 9:
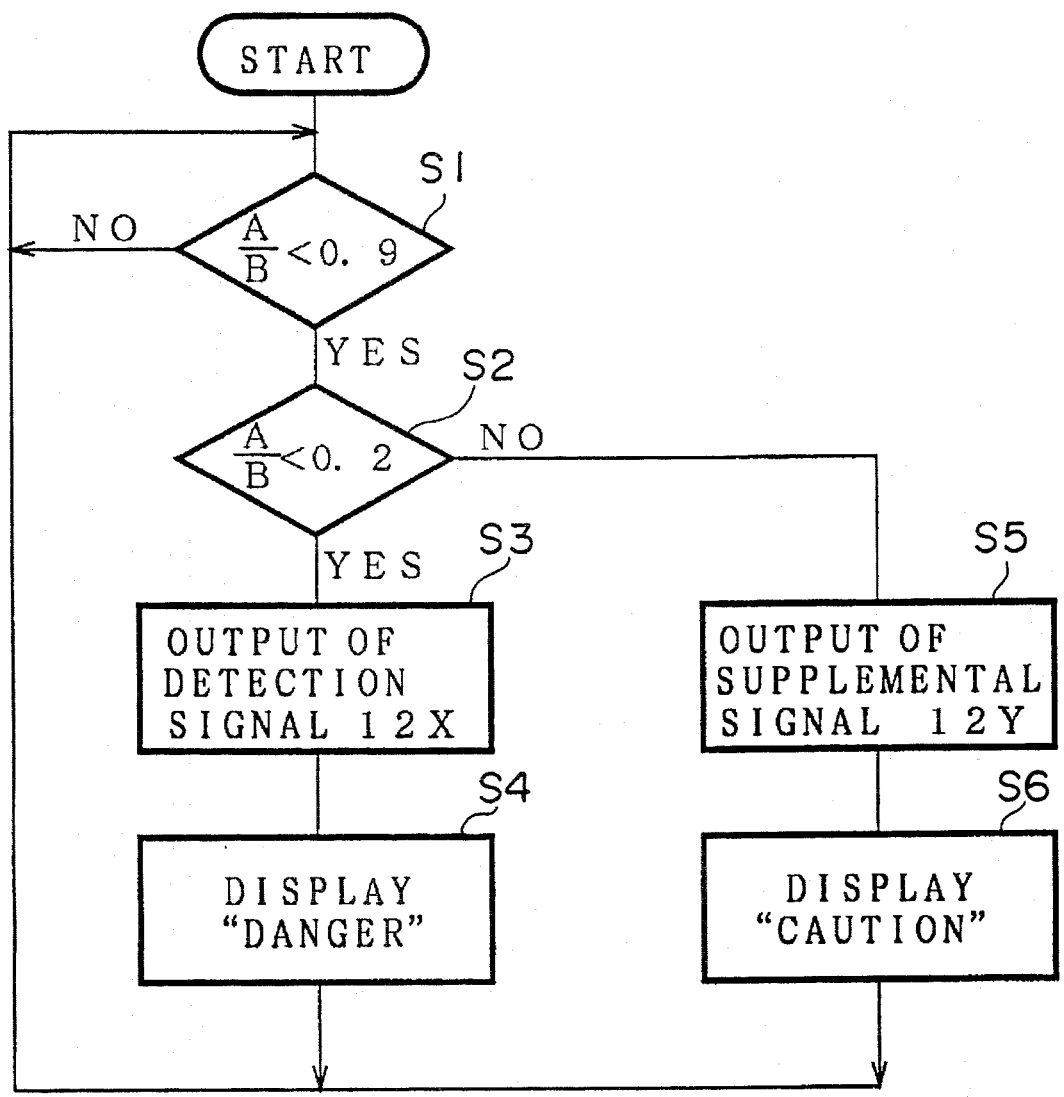
FIG. 9 is a flow chart showing control steps of a tank-emergency detection means in the safety apparatus for a fuel tank according to the first embodiment.

In the case of the fuel tank 1 made of a metal, a plastic fixture 64 shown in FIG. 6 is used. The fixture 64 comprises a substrate part 65, an attaching part 66 continuously formed on a surface of the substrate part 65, and a plurality of fitting parts 67 formed on the other surface of the substrate part 65 at a constant pitch, which are formed in a body. The attaching part 66 has a cross sectional shape which is approximately a ring with a part cut off a part therefrom. Each of the fitting parts 67 projects from the other surface of the substrate part 65 and has a fitting piece 68 with an arrowhead-like shape. A plurality of supporting members 73 for supporting the fixture 64 are fixed at predetermined positions on the outer surface of the fuel tank 1 at a constant pitch. Each of the supporting members 73 comprises a fixed portion 70 which is fixed to the outer surface of the fuel tank 1 by welding or the like; a standing portion 71 which stands perpendicularly to the outer surface of the wall portion 1a of the tank 1; and a connecting portion 72 spaced from the outer surface of the tank 1, which extends in a direction parallel to the fixed portion 70 and has a hole for connecting the fitting piece 68 with an arrowhead-like shape of the fixture 64, as shown in FIG. 7. The fixture 64 having the rubber optical fiber 55 which is inserted in the attaching part 66 thereof is connected to the welded supporting members 73 by fixing the fitting piece 68 with an arrowhead-like shape of the fixture 64 into the hole of the connecting portion 72 of the supporting members 73, as shown in FIG. 8.

The light supply means 56 shown in FIG. 2 comprises the light emitting diode 62, a transistor 76, a resistor 77 for restricting the base current of the transistor 76, and a resistor 78 for restricting the current of the light emitting diode 62. The base of the transistor 76 is connected to an output buffer 80 through the resistor 77. The emitter of the transistor 76 is grounded and the collector thereof is connected to a terminal of the light emitting diode 62. The other terminal of the light emitting diode 62 is connected to the resistor 78 having the other terminal to which a predetermined constant voltage is applied. Consequently, the light emitting diode 62 supplies a predetermined light quantity into the rubber optical fiber 55 which has one terminal connected to the light emitting diode 62.

The light quantity detecting means 57 comprises a photodiode 81 connected to the other terminal of the rubber optical fiber 55, which changes the light quantity transmitted from the light emitting diode 3 through the rubber optical fiber 55, to electric current; an OP AMP 82 for amplifying the difference between the voltages of the positive and negative input terminals of the OP AMP 82; a resistor 83 for protecting the OP AMP 82; a capacitor 84 for preventing oscillation; a resistor 85 for current-voltage conversion; an analog-to-digital converter 86 of 8 bits; an operation part 87 such as a microcomputer; and an output buffer 80. The output buffer 80 is connected to display devices 88 which are provided at predetermined positions in the vehicle at which a driver can easily recognize, to the light supply means 56, and to the control means 6.

A terminal of the photodiode 81 having the other grounded terminal is connected to the input negative terminal of the OP AMP 82 through a resistor 83. The input positive terminal of the OP AMP 82 is grounded. The output terminal of the OP AMP 82 is connected to the operation part 87 through the analog-to-digital converter 86. Each of a capacitor 84 and a resistor 85 is connected to the OP AMP 82 with the resistor 83 in parallel. The OP AMP 82, the resistors 83 and 85, and the capacitor 84 constitute an amplifier 89. The operation part 87 is connected to the output buffer 80.

In the tank-emergency detection means 12 having such components, the light quantity transmitted through the rubber optical fiber 55 is changed to electric current by the photodiode 81. The electric current outputted from the photodiode 81 is amplified by the amplifier 89. The electric current outputted from the amplifier 89 is changed to a voltage which can be operated, by the analog-to-digital converter 86, and is outputted to the operation part 87.

In the operation part 87, the ordinary light quantity inputted into the operation part through the analog-to-digital converter 86 when the fuel tank 1, i.e., the rubber optical fiber 55, receives substantially no large external force; and the threshold value of the ratio of the detected light quantity inputted to the operation part 87 through the analog-to-digital converter 86 to the ordinary light quantity, i.e., the detected light quantity A / the ordinary light quantity B, are stored. The operation part 87 compares the actual ratio of light quantity with the threshold value of the ratio to output a signal according to the level of the ratio of light quantity.

That is, when the fuel tank 1 mounted on a vehicle receives an impact caused by a crash of the vehicle, the force thereof is transmitted to the rubber optical fiber 55. A predetermined light quantity is constantly supplied into the rubber optical fiber 55 from the light emitting diode 62. However, when the rubber optical fiber 55 receives an impact, i.e., an external force, the light quantity transmitted through the rubber optical fiber 55 is changed by the external force. The change of the transmitted light quantity is detected by the photodiode 81, and thereafter is outputted from the photodiode 81 into the operation part 87 through the amplifier 89 and the analog-to-digital converter 86.

In the operation part 87, the ratio of the actual detected light quantity to the previously stored ordinary light quantity when the fuel tank 1 receives substantially no large external force; i.e., the detected light quantity A / the ordinary light quantity B, is operated. The operation part 87 carries out the control of the safety device for the fuel tank on the basis of the operated results, in the order shown in a flow chart of FIG. 9.

The content of the control of every step will be explained as follows.

STEP S1

The operation part 87 determines whether or not the ratio of the detected light quantity A / the ordinary light quantity B is less than the second predetermined threshold value of light quantity ratio, e.g., 0.9. If the ratio is less than the second predetermined threshold value, the program proceeds to step S2. If the ratio is not less than the second predetermined threshold value, the program returns to step S1.

STEP S2

The operation part 87 judges whether or not the ratio of the detected light quantity A / the ordinary light quantity B is less than the first predetermined threshold value of light quantity ratio, e.g., 0.2. If the ratio is less than the second predetermined threshold value, the program proceeds to step S3. If the ratio is not less than the second predetermined threshold value, the program goes to step S5.

STEP S3

The operation part 87 makes the output buffer 80 output an emergency detection signal 12X with a high level to the control means 6. The program proceeds to step S4.

STEP S4

The operation part 87 makes the output buffer 80 output a signal to display "DANGER" to the display device 88 in order to notify the driver that the fuel tank 1 is in an extraordinary state and in a dangerous state. Then, the program returns to step S1.

STEP S5

The operation part 87 makes the output buffer 80 output an emergency supplemental signal 12Y with a high level to the control means 6. The program proceeds to step S6.

STEP S6

The operation part 87 makes the output buffer 80 output a signal to display "CAUTION" to the display device 88 in order to notify the driver that the fuel tank 1 has been damaged. Then, the program returns to step S1. According to the output signal, the display device 88 carries out the above-described display.

When the detected transmitted light quantity is less than 20% of the ordinary light quantity, which includes when the rubber optical fiber 55 is disconnected, since the external force applied to the rubber optical fiber 55, i.e., to the fuel tank 1, has a magnitude which can seriously damage or crack the fuel tank 1, that is, since the fuel tank 1 is in a dangerous state, the operation part 87 outputs an emergency detection signal 12X to the control means 6. On the other hand, when the detected transmitted light quantity is not less than 20% and less than 90% of the ordinary light quantity, since the fuel tank 1 may receive some damage such as abrasions, while the external force applied to the rubber optical fiber 55, i.e., to the fuel tank 1, does not have the magnitude which can give large damage or cracks to the fuel tank 1, the operation part 87 outputs an emergency supplemental signal 12Y. The first threshold value of light quantity ratio, e.g., 0.2, and the second threshold value of light quantity ratio, e.g., 0.9; are previously and experimentally determined, are changeable according to the material or the shape of the fuel tank 1. When the ratio of the detected light quantity A / the ordinary light quantity B is less than the second predetermined threshold value of light quantity ratio, the operation part 87 may always output the emergency supplemental signal 12Y.

In this embodiment, the control of the safety apparatus for the fuel tank is carried out by using only two threshold values of light quantity ratio, i.e., 0.2 and 0.9. However, the control may be carried out by using three or more threshold values of light quantity ratio in order to more exactly know the state of the fuel tank.

According to this embodiment in which an optical fiber is used, it is possible to provide a safety apparatus for the fuel tank having a high reliability. That is, to provide a safety apparatus which is hard to erroneously operate by receiving electrical noises or the like. Therefore, it is possible to prevent an unnecessary supply of the gelling agent into the fuel tank caused by electrical noises or the like even in the case when it is not an emergency.

The control means 6 comprises a OR gate 91, a first AND gate 92, a second AND gate 93, and an OR gate 94 into which the outputs of the OR gate 91, of the first AND gate 92, and of the second AND gate 93 are inputted, as shown in FIG. 1.

The outputs of the first acceleration comparison judgement circuit 27 of the acceleration-emergency detection means 9, of the temperature-emergency detection means 10, and of the tank-emergency detection means 12 are inputted into the OR gate 91. The output of the OR gate 91 is inputted into the FET 14 and the fuel pump control module 13, through the OR gate 94. The relationship between the input and the output of the OR gate 91 is shown in a truth table of FIG. 10. As shown in this table, when at least one of the emergency detection signal 9X with a high level from the acceleration-emergency detection means 9, the emergency detection signal 10X with a high level from the temperature-emergency detection means 10, and the emergency detection signal 12X with a high level from the tank-emergency detection means 12, which is outputted in step S3, is inputted into the OR gate 91, a driving signal 6X with a high level is outputted to the fuel pump control module 13 and the FET 14, through the OR gate 94.

The outputs of the tilt-emergency detection means 11 and the tank-emergency detection means 12 are inputted into the first AND gate 92. The output of the first AND gate 92 is inputted into the FET 14 and the fuel pump control module 13, through the OR gate 94. The relationship between the input and the output of the first AND gate 92 is shown in a table of truth value of FIG. 11. As shown in this table, when both the emergency tendency signal 11Z with a high level from the tilt-emergency detection means 11, and the emergency supplemental signal 12Y with a high level from the tank-emergency detection means 12, which is outputted in the step S5, are inputted into the first AND gate 92, a driving signal 6X with a high level is outputted to the fuel pump control module 13 and the FET 14, through the OR gate 94.

The outputs of the tilt-emergency detection means 11 and the acceleration-emergency detection means 9 are inputted into the second AND gate 93. The output of the second AND gate 93 is inputted into the FET 14 and the fuel pump control module 13, through the OR gate 94. The relationship between the input and the output of the second AND gate 93 is shown in a table of truth values of FIG. 12. As shown in this table, when both the emergency tendency signal 11Z with a high level from the tilt-emergency detection means 11, and the emergency supplemental signal 9Y with a high level from the second acceleration comparison judgement circuit 28, a driving signal 6X with a high level is outputted to the fuel pump control module 13 and the FET 14, through the OR gate 94.

As described above, the FET 14 functions as a switch for connecting the power supply circuit 15 and motor 4, when the driving signal 6X with a high level is outputted from the control means 6. The fuel pump control module 13 is for controlling a fuel pump which supplies a flammable liquid in the fuel tank 1 into an engine which is not shown in the figures. When the driving signal 6X with a high level is inputted from the control means 6 into the fuel pump control module 13, supply of the flammable liquid into the engine by the fuel pump is forcedly stopped.

In the safety apparatus of the fuel tank having such a construction, the control means 6 outputs the driving signal 6X, when at least one of the emergency detection signals 9X, 10X, and 12X is outputted from the acceleration-emergency detection means 9, the temperature-emergency detection means 10, and the tank-emergency detection means 12. When an extremely dangerous state in the fuel tank 1 occurs, that is, when the temperature of the inside of the fuel tank 1 exceeds the temperature threshold value which is approximately the flash point of the flammable liquid in the fuel tank 1, when the acceleration of the vehicle exceeds the first acceleration threshold value by a large impact caused by a crash, i.e., when a sudden deceleration caused the air bag to operate, or when the ratio of the detected light quantity transmitted through the rubber optical fiber 55 to the ordinary light quantity is less than the first predetermined threshold value 0.2 of light quantity ratio.

Accordingly, the fuel pump is stopped and the motor 4 or a compressed gas (for example, compressed air, or $N_2$ gas) tank is driven to jet the gelling agent from the gelling agent tank 2 into the fuel tank 1, so that the flammable liquid in the fuel tank 1 is gelatinized. Therefore, since outflow of the flammable liquid from the fuel tank 1 is prevented by the gelatinization, it is possible to prevent fire caused by fuel outflow. Furthermore, even if a fire occurred in the fuel tank 1, it is possible to prevent the spread of fire to the internal combustion engine of the vehicle. An alarm warning device which is not shown in the figures may be provided to sound a warning when such an extremely dangerous state in the fuel tank 1 occurs.

Furthermore, the control means 6 outputs the driving signal 6X, when both the emergency tendency signal 11Z from the tilt-emergency detection means 11, and at least one of the emergency supplemental signals 9Y and 12Y from the acceleration-emergency detection means 9 and the tank-emergency detection means 12, are outputted at the same time. That is, when the tilt angle of the vehicle exceeds the predetermined threshold value of tilt angle, e.g., 90°, (rollover), which is dangerous for the vehicle and in which the judgement of degree of danger is difficult; at the same time, when the acceleration of the vehicle exceeds the second acceleration threshold value which is less than the second acceleration threshold value, by some impact caused by a crash or the like, or when the ratio of the detected light quantity transmitted through the rubber optical fiber 55 to the ordinary light quantity is larger than the first predetermined threshold value of light quantity ratio, e.g., 0.2, and less than the second predetermined threshold value of light quantity ratio, e.g., 0.9; the driving signal 6X is outputted.

Accordingly, the fuel pump is stopped and the motor 4 is driven to jet the gelling agent from the gelling agent tank 2 into the fuel tank 1, so that the flammable liquid in the fuel tank 1 is gelatinized. Therefore, since outflow of the flammable liquid from the fuel tank 1 is prevented by the gelatinization, it is possible to prevent fire caused by fuel outflow. Furthermore, even if a fire occurs in the fuel tank 1, it is possible to prevent spread of the fire to the internal combustion engine of the vehicle.

The reason that output of the driving signal 6X is carried out by a combination of the emergency tendency signal 11Z from the tilt-emergency detection means 11 and the emergency supplemental signal 12Y from the tank-emergency detection means 12, is for previously coping with the danger by gelatinizing the flammable liquid, because an accident such as rollover of the vehicle occurs in a state of the fuel tank 1 receiving some damage. The reason that output of the driving signal 6X is carried out by a combination of the emergency tendency signal 11Z from the tilt-emergency detection means 11 and the emergency supplemental signal 9Y from the acceleration-emergency detection means 9, is also for previously coping with the danger.

In the safety apparatus for a fuel tank of the above described first embodiment, since the tank-emergency detection means 12 detects emergency in the fuel tank itself, it is possible to directly detect whether or not an emergency occurs on the fuel tank 1 due to crashes of the vehicle.

Since the tank-emergency detection means 12 uses a rubber optical fiber 55, it is possible to quantitatively detect the emergency in the fuel tank 1, i.e., the degree of impact caused by external force, by the change of light quantity transmitted through the rubber optical fiber 55. If the rubber optical fiber 55 is disconnected, i.e., if the fuel tank 1 is extensively damaged such as the occurrence of a crack, the transmitted light quantity through the rubber optical fiber 55 becomes 0. Therefore, it is possible to surely know how much influenced the fuel tank 1 received by the external force. Accordingly, it is possible to take measures to cope with the extent of the influence to the fuel tank 1.

Furthermore, since the safety apparatus of the fuel tank as described in the first embodiment comprises a rubber optical fiber 55 which has a good flexibility and the transmission quantity of which changes according to external pressure given to the optical fiber 55, it is possible to very sensitively detect the applied impact of the fuel tank 1, without limitation of the position for providing the optical fiber 55. The rubber optical fiber 55 may be provided not only on the fuel tank 1 but also on the attached component thereof, e.g., a pipe such as a filler duct, a stay or the like, in order to detect an emergency in the fuel tank 1. The construction of the safety apparatus using the rubber optical fiber 55 is very simple.

The control means 6 outputs the driving signal 6X, when at least one of the emergency detection signals 9X, 10X, and 12X is outputted, that is, when an extremely dangerous state to the fuel tank 1 occurs, i.e., when the temperature of the inside of the fuel tank 1 exceeds the temperature threshold value, when the acceleration of the vehicle exceeds the first acceleration threshold value, or when the ratio of the detected light quantity transmitted through the rubber optical fiber 55 to the ordinary light quantity is less than the first predetermined threshold value of light quantity ratio.

Furthermore, the control means 6 outputs the driving signal 6X, when both the emergency tendency signal 11Z from the tilt-emergency detection means 11, and at least one of the emergency supplemental signals 9Y and 12Y from the acceleration-emergency detection means 9 and the tank-emergency detection means 12, are outputted at the same time. That is, when the tilt angle of the vehicle exceeds the predetermined threshold value of tilt angle, which is dangerous for the vehicle and in which the judgement of degree of danger is difficult; and at the same time, when the acceleration of the vehicle exceeds the second acceleration threshold value which is less than the first acceleration threshold value, or when the ratio of the detected light quantity transmitted through the rubber optical fiber 55 to the ordinary light quantity is larger than the first predetermined threshold value of light quantity ratio and is less than the second predetermined threshold value of light quantity ratio which is larger than the first predetermined threshold value of light quantity ratio; the driving signal 6X is outputted and the gelling agent is supplied into the fuel tank 1. Therefore, by using the above control by the control means 6, it is possible to effectively cope with various emergencies in the vehicle, and to prevent occurrence of accidents.

Furthermore, when the ratio of the detected light quantity transmitted through the rubber optical fiber 55 to the ordinary light quantity is less than the first predetermined threshold value of light quantity ratio, it is possible to display an indication that the fuel tank 1 is in a dangerous state by the display device 88 in order to notify the driver. When the ratio of the detected light quantity transmitted through the rubber optical fiber 55 to the ordinary light quantity is less than the second predetermined threshold value of the light quantity ratio which is larger than the first predetermined threshold value of light quantity ratio, it is possible to display an indication that the fuel tank 1 has received some damage, in order to notify the damaged state of the fuel tank 1 to the driver in the vehicle.

Since the rubber optical fiber 55 is provided on all of the surfaces of the fuel tank 1, it is possible to detect the external forces not only in the horizontal direction, but also in the vertical direction.

The optical fiber used in the embodiment is not limited to a rubber optical fiber. Any optical fiber which has good flexibility, and the transmission quantity of which changes according to external pressure, may be used for the safety apparatus of the present invention.

Detection of tank-emergency by using the optical fiber 55 may be also carried out in the following manner.

In the operation part 87, reference data with respect to the relation between the light quantity (the electric current) and the external forces is previously stored. External force given to the rubber optical fiber 55, i.e., external force given to the fuel tank 1, is operated by comparing the numerical value inputted from the analog-to-digital converter 86 with the reference data. Then, the operated external force is compared with data with respect to the relationship between the external force given to the fuel tank 1 and the content of emergency in the fuel tank 1 caused by the external force, which were obtained by previous tests. Accordingly, the content of emergency in the fuel tank 1 is judged, and a signal corresponding to the content of the emergency may be outputted. Furthermore, it is possible to perform close monitoring by recording the external force and the content of emergency caused by the external force.

Next, the safety apparatus of the fuel tank according to the second embodiment of the present invention will be explained with reference to FIGS. 13–15. The differences between the first and second embodiments are the construction of the tank-emergency detection means 12 and a portion of the control content of the control means 6. Therefore, those differences will be mainly explained as follows.

Figure 13:
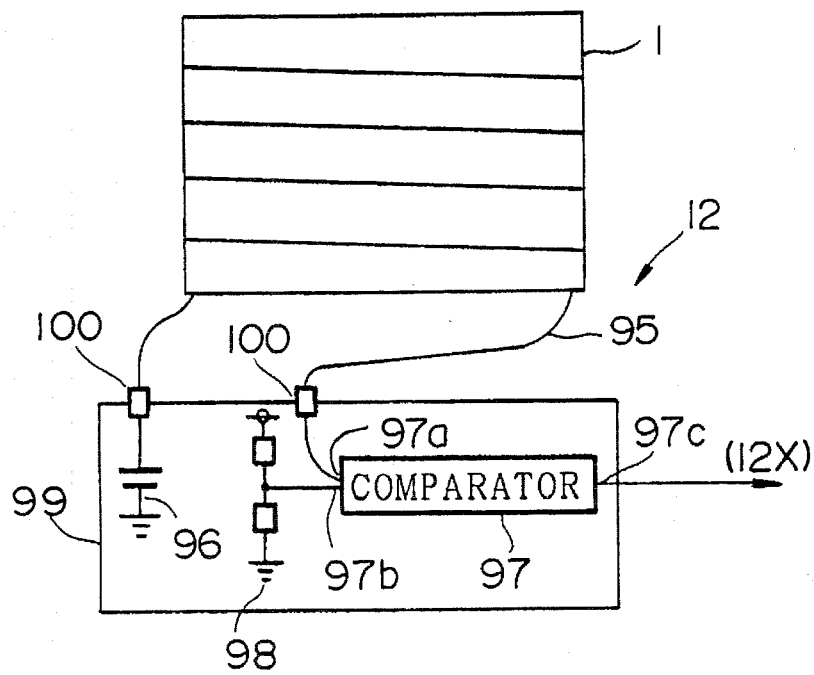
FIG. 13 is a circuit diagram showing a tank-emergency detection means in the safety apparatus for a fuel tank according to a second embodiment of the present invention.
Figure 14:
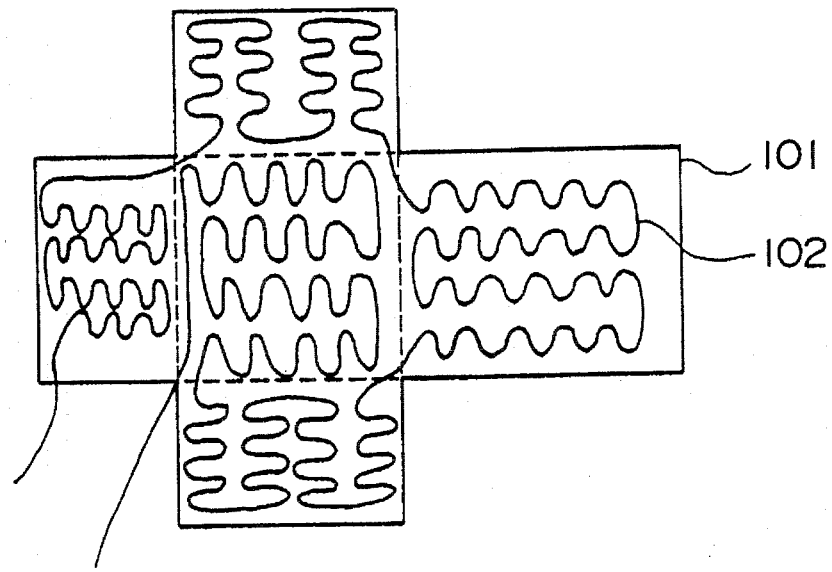
FIG. 14 is a development showing another example of a conductive line member of a tank-emergency detection means in the safety apparatus for a fuel tank according to a second embodiment.

As shown in FIG. 13, the tank-emergency detection means 12 in the second embodiment comprises an electric wire 95 which is a single solid wire (not a multiple stranded wire) coated with an insulating material layer and is wound around the entirety of the fuel tank 1 at a constant pitch, a voltage applying means 96 for applying a constant voltage to a terminal of the electric wire 95, and a comparator 97 which judges whether the voltage of the other terminal of the conductive wire 95 is "high" or "low" and which outputs an emergency detection signal 12X showing disconnection of the electric wire 95 when the voltage of the other terminal of the conductive wire 95 is decreased.

The comparator 97 has a construction similar to that of the comparison judgement circuit 27 in the first embodiment of the present invention shown in FIG. 1. The comparator 97 has two input terminals 97a and 97b. One input terminal 97a is connected to the other terminal of the conductive wire 95. A reference voltage is applied to the other input terminal 97b by a reference voltage applying means 98.

A judgement means 99 comprises the comparator 97 and the reference voltage applying means 98. Numeral 100 denotes a connector for connecting the electric wire 95 with the judgement means 99.

A constant voltage is applied to one terminal of the electric wire 95 from the voltage applying means 96.

(1) Therefore, when there is no disconnection in the electric wire 95, and the voltage applied to the other terminal of the electric wire 95 from the voltage applying means 96 through the electric wire 95, i.e., the voltage of the input terminal 97a of the comparator 97, is larger than the voltage applied to the other input terminal 97b of the comparator 97 from the reference voltage applying means 98, the comparator 97 outputs a signal with a low level "0". That is, no emergency detection signals 12X are outputted from the output terminal 97c of the comparator 97.

(2) When the electric wire 95 is disconnected, i.e., when the voltage from the voltage applying means 96 is not applied to the voltage of the input terminal 97a of the comparator 97 through the disconnected electric wire 95, the voltage of the input terminal 97a of the comparator 97 is less than the voltage applied to the other input terminal 97b of the comparator 97 from the reference voltage applying means 98. Consequently, the comparator 97 outputs a signal with a high level "1" which is an emergency detection signal 12X showing an emergency in the fuel tank.

Disconnection of the electric wire 95 as described in the above paragraph (2) may occur when the fuel tank 1 mounted on the vehicle is cracked or damaged not only by vehicle crashes but also by fatigue of the construction material of the fuel tank 1.

The output terminal 97c of the comparator 97 in the tank-emergency detection means 12 of the second embodiment is connected to the input terminal of the OR gate 91. In this embodiment, since no emergency supplemental signals 12Y are outputted from the tank-emergency detection means 12, the first AND gate 92 may be removed.

When the fuel tank 1 mounted on the vehicle is deformed, cracked or damaged by an external force caused by vehicle crashes or the like, an emergency detection signals 12X is outputted from the output terminal 97c of the comparator 97 to the OR gate 91 of the control means 6. Consequently, the control means 6 outputs a driving signal 6X to the gate of the FET 14 in the gelling agent supply system to drive the motor 4 for supplying the gelling agent into the fuel tank 1.

As described above, since the tank-emergency detection means 12 in the second embodiment can surely detect occurrence of cracks, damages or the like on the fuel tank 1 and causes the gelling agent supply system to force the gelling agent into the fuel tank 1, it is possible to surely prevent outflow of the fuel in the fuel tank 1.

In the second embodiment, if the fuel tank 1 is made of steel, the electric wire 95 may be fixed on the outer or inner wall of the fuel tank 1 by adhering them thereto. The electric wire 95 may also be fixed on the outer or inner wall of the fuel tank 1 by using the attaching member 64 or the like. On the other hand, if the fuel tank comprises a plastic multi-layer structure, the electric wire 95 may be fixed by sandwiching between the plastic layers. It is also possible to adopt the attaching portion 63 shown in FIG. 5 in the first embodiment.

In the second embodiment, the electric wire 95 is fixed alone on the fuel tank 1. However, the fixing of the conductive line member to the fuel tank 1 is not limited to this. For example, as shown in FIG. 14, the fixing of the conductive line member to the fuel tank 1 may be carried out by adhering a cloth 101 which is woven with a conductive wire 102 so that the conductive wire 102 does not cross itself, on the outside surface of the fuel tank 1. A conductive line member with a predetermined pattern may be formed by etching a metal clad flexible base material using a predetermined resist pattern, instead of the cloth 101 with a conductive wire 102. On the formed conductive line member, an insulating layer may be formed. The flexible base material having the conductive line member thereon may be adhered on the outside surface of the fuel tank 1. If the fuel tank 1 comprises a plastic multi-layer structure, the fixing of the conductive line member to the fuel tank 1 may be carried out by sandwiching the cloth woven with the conductive wire between the plastic layers.

In the above embodiment, the electric wire 95 coated by an insulating material (not shown) is provided on all of the surfaces of the fuel tank 1. However, the fixing of the conductive line member to the fuel tank 1 is not limited to this. For example, the conductive line member may be constructed by printing an electrically conductive coating material on the fuel tank 1 in a line, instead of the conductive wire 95. The constant voltage is applied to one terminal of the printed conductive line member. When the voltage of the other terminal of the printed conductive line member lowers, it can be judged that the printed conductive line member is disconnected, i.e., the fuel tank 1 is damaged.

In the above described first and second embodiments, an emergency in the vehicle is detected by four emergency detection means, i.e., the acceleration-emergency detection means 9, the temperature-emergency detection means 10, the tilt-emergency detection means 11 and the tank-emergency detection means 12, however, is not limited to this. In order to detect an emergency in the vehicle, a pressure-emergency detection means for detecting an emergency by detecting the pressure in the fuel tank 1, a fire detection means for detecting a fire, or the like may be provided furthermore. The number of the temperature sensor, the tilt sensor, and the acceleration sensor is not limited. The number may be one or there may be a plurality thereof.

Figure 15:
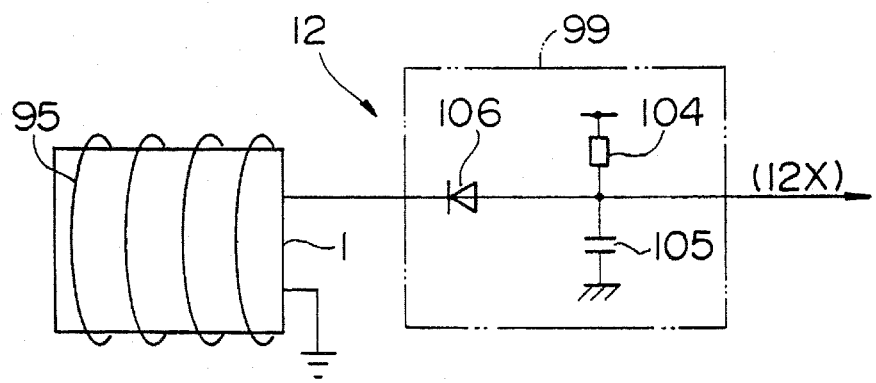
FIG. 15 is a circuit diagram showing another example of tank-emergency detection means in the safety apparatus for a fuel tank according to a second embodiment.

A circuit shown in FIG. 15 may be used as a judgement means for outputting an emergency detection signal 12X with a high level when the conductive line member such as an electric wire is disconnected. In this circuit, a terminal of the electric wire 95 provided on the fuel tank 1 is grounded, and the other terminal thereof is connected to a resistor 104, a capacitor 105, and the OR gate 91 shown in FIG. 1, through a diode 106. A constant voltage is applied to the other terminal of the capacitor 104. The other terminal of the resistor 105 is grounded.

Next, a first modification of the safety apparatus of the fuel tank of the invention will be explained with reference to FIGS. 16–18, as follows.

Figure 16:
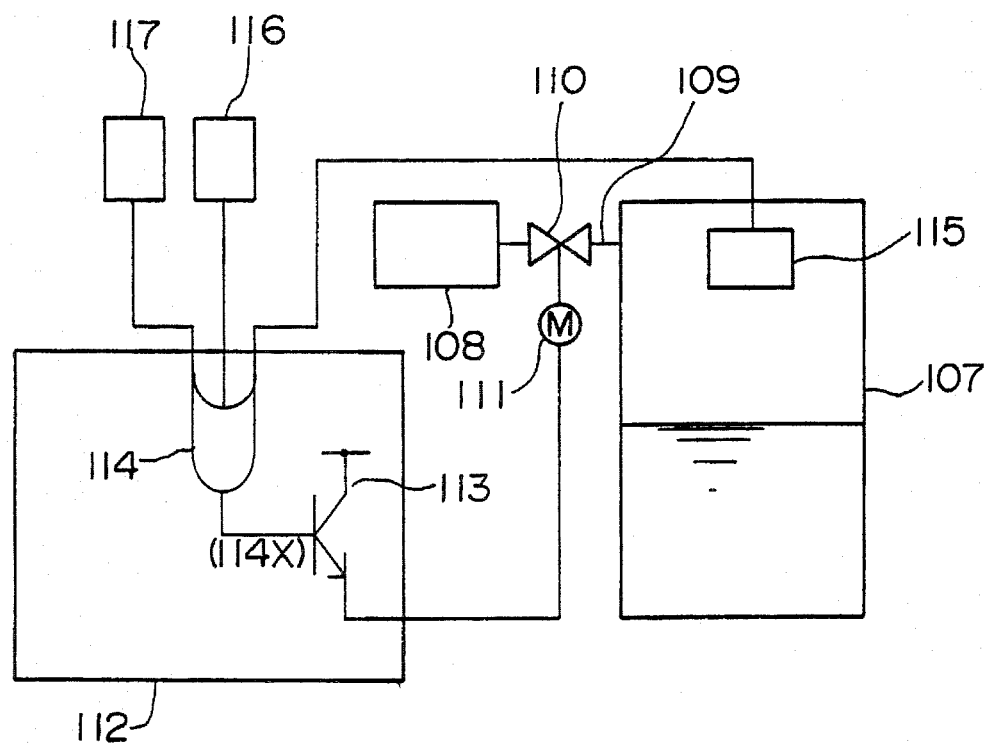
FIG. 16 is a circuit diagram showing a modification of the safety apparatus for a fuel tank according to the present invention.

As shown in FIG. 16 showing a general idea of the first modification of the safety apparatus of the fuel tank, valve 110 and a switching motor 111 for opening or closing the valve 110 are provided on the middle of the pipe 109 for connecting the fuel tank 107 and the gelling agent tank 108. The drive of the switching motor 111 is controlled by a control unit 112.

The control unit 112 comprises a transistor 113 such as a FET and an OR gate 114. In the control unit 112, each of detection signals outputted from a temperature sensor 115, a tilt sensor 116, or a crash sensor 117 is inputted into the OR gate 114. Each of the temperature sensor 115, the tilt sensor 116, and the crash sensor 117 has a comparison judgement circuit (not shown) having a construction similar to that of the comparison judgement circuit 27 in the first embodiment of the present invention shown in FIG. 1. When a detection signal which indicates an extraordinary state of the vehicle is outputted from at least one of the temperature sensor 115, the tilt sensor 116, and the crash sensor 117, and is inputted into the OR gate 114, an emergency judgement signal is outputted from the OR gate 114. Then, a driving signal for instructing to change the closed state of the valve 110 to the open state thereof is outputted from the transistor 113 to the switching motor 111 on the basis of the emergency judgement signal.

In the three sensors, the temperature sensor 115 is for detecting the temperature of the inside of the fuel tank 107. Temperature data from the temperature sensor 115 is supplied to a comparator 119, as shown in FIG. 17. The comparator 119 judges whether or not the temperature data from the temperature sensor 115 are larger than a preset value with respect to the flash temperature of the fuel. As a result of the judgement by the comparator 119, when the temperature detected by the temperature sensor 115 is larger than the preset value with respect to the flash temperature of the fuel, the comparator 119 outputs an emergency judgement signal which indicates an emergency state of the fuel tank, to the OR gate 114.

The tilt sensor 116 comprises, for example, a container including a small quantity of mercury and a pair of electrodes. The tilt sensor 116 is organized so that the pair of electrodes can be electrically connected to each other by movement of the mercury when the container is tilted at an angle larger than a predetermined value. When the vehicle having the tilt sensor 116 is tilted at an angle larger than a predetermined angle, the tilt sensor 116 outputs an tilt detected signal which indicates an extraordinary state of the vehicle, to the OR gate 114.

The crash sensor 117 comprises an acceleration sensor for detecting application of a deceleration larger than a preset value to the vehicle. When the vehicle having the crash sensor 117 receives a deceleration larger than the preset value by a crash or the like, the crash sensor 117 outputs a crash detection signal which indicates an occurrence of a crash, to the OR gate 114.

Next, the judgement standard of the control means 6 will be explained as follows.

Figures 17, 18:
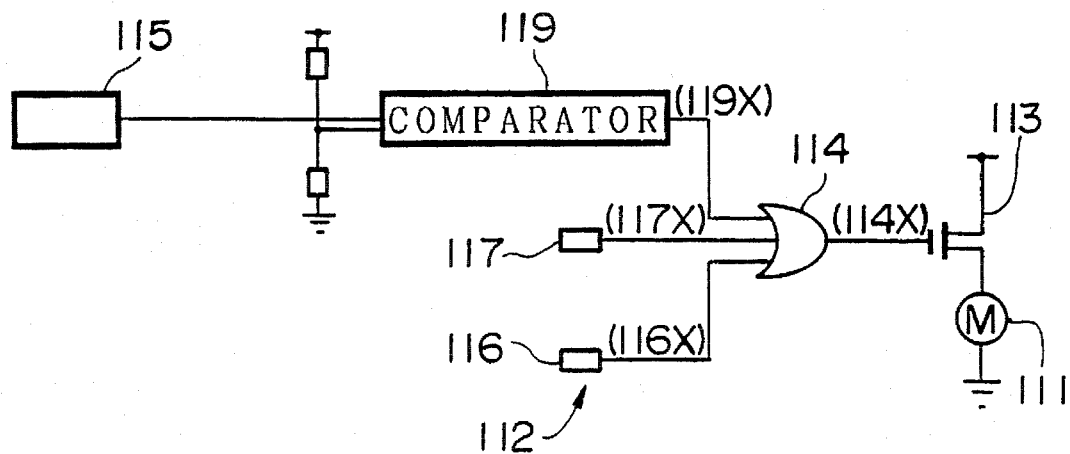
FIG. 17 is a circuit diagram showing a control means in a modification of the safety apparatus for a fuel tank according to the present invention.
FIG. 18 is a table of truth value of a control means in a modification of the safety apparatus for a fuel tank according to the present invention.
Figure 19A:
FIG. 19 is a partially sectional view showing a rollover valve used in another modification of the safety apparatus for a fuel tank according to the present invention.
Figure 19B:
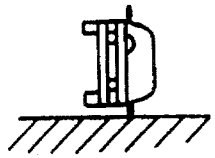
Figure 19C:
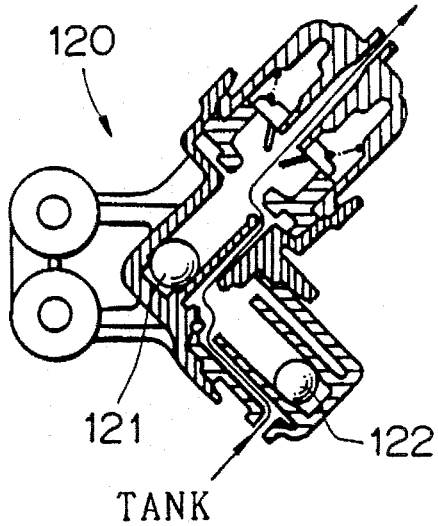
Figure 19D:
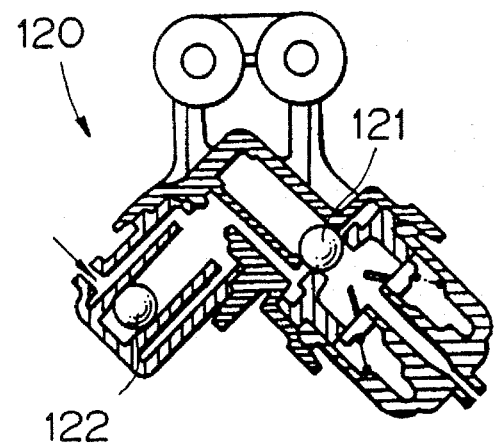
Figure 19E:
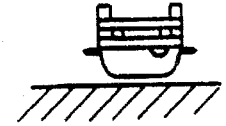
Figure 19F:
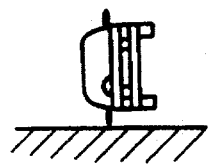
Figure 19G:
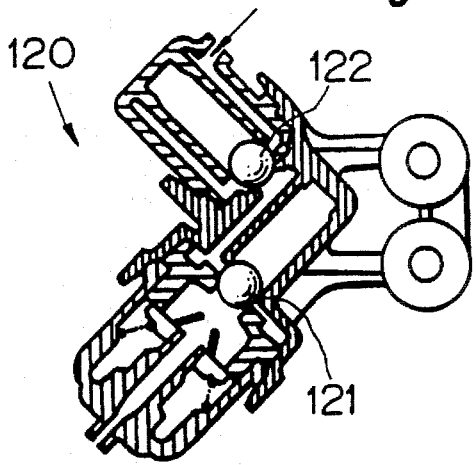
Figure 19H:
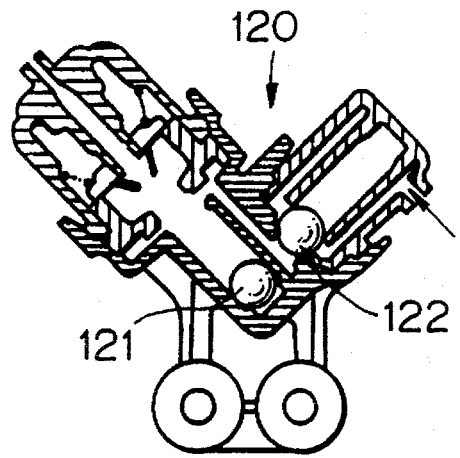

As shown in FIG. 18, when at least one of the extraordinary temperature signal, the tilt detected signal and the crash detection signal which indicate extraordinary states of the vehicle is outputted from one of the comparator 119 to which temperature data are inputted from the temperature sensor 115, the tilt sensor 116, and the crash sensor 117, that is, when one, two or all of the extraordinary temperature signal, the tilt detected signal and the crash detection signal which indicate extraordinary states of the vehicle is outputted from one, two, or all of the comparator 119 to which temperature data are inputted from the temperature sensor 115, the tilt sensor 116, and the crash sensor 117, an emergency judgement signal (output of the OR gate 114 is "1") for driving the switching motor 111 is outputted from the OR gate 114 in the control unit 112 (output thereof is shown by X) to the transistor 113.

According to the safety apparatus for the fuel tank of the embodiment, when an emergency in the vehicle occurs, the switching motor 111 is driven to change the closed state of the valve 110 to the open state thereof, according to the detection signal outputted from the plurality of detecting means, e.g., the comparator 119 to which temperature data are inputted from the temperature sensor 115, the tilt sensor 116, and the crash sensor 117. The gelling agent tank 108 has a structure to jet the gelling agent therein into the fuel tank 107 by a compressed gas, e.g., compressed air or N₂ gas, which is contained in the gelling agent tank 108 when the valve 110 is in the open state. Consequently, it is possible to supply the gelling agent in the gelling agent tank 108 into the fuel tank 107 through the pipe 109 in order to gelatinize the fuel in the fuel tank 107. Therefore, since outflow of the fuel from the fuel tank is prevented, it is possible to prevent fire caused by fuel outflow. Furthermore, even if a fire occurred in the fuel tank 107, it is possible to prevent the spread of fire to the internal combustion engine of the vehicle.

Since, in the safety apparatus for the fuel tank as explained above, the detecting means comprises a plurality of sensors such as a temperature sensor 115 for detecting the temperature in the fuel tank 107, an tilt sensor 116 for detecting rollover of the vehicle, a crash sensor 117 for detecting crash of the vehicle, or the like; and the controller outputs a drive signal to the supply system so as to supply the gelling agent into the fuel tank 107, under the condition that at least one of the plurality of sensors outputs a detection signal indicating an emergency in the vehicle, it is possible to effectively cope with various emergency in the vehicle and to previously prevent occurrence of accidents.

In the above embodiment, the detecting means having only three sensors, i.e., the temperature sensor 115, the tilt sensor 116 and a crash sensor 117, is disclosed as a detecting means for detecting emergency in the vehicle. However, the detecting means is not limited to this; for example, the detecting means may be further provided with a pressure sensor for detecting the pressure of the inside of the fuel tank 107, a fire detecting sensor for detecting a fire, a crack detecting sensor for detecting a crack of the fuel tank, or the like, in order to detect various emergency in the vehicle. The crack detecting sensor for detecting a crack of the fuel tank may be constructed by an electric wire wound around the fuel tank 107, wherein a constant voltage is applied to the electric wire. In this case, occurrence of a crack of the fuel tank 107 can be detected by the drop of the voltage between the both ends of the wound electric wire which is caused by disconnection of the electric wire.

There may be one or a plurality of the temperature sensor 115, the tilt sensor 116 and a crash sensor 117.

In the above-described embodiment, the supply system is constructed by the pipe 109, the valve 110, and the switching motor 111.

Next, a second modification of the safety apparatus of the fuel tank of the invention will be explained with reference to FIGS. 19–21, as follows.

The difference between the safety apparatuses of the first and second modifications is the existence of a rollover valve 120 which is provided in the safety apparatus of the second embodiment.

The rollover valve 120 is provided on the middle of a pipe which connects the fuel tank 107 and the internal combustion engine of the vehicle. The rollover valve 120 is for automatically shutting off flow of the fuel from the fuel tank 107 to the internal combustion engine when the vehicle rolls over. The rollover valve 120 includes two metal balls constituting a ball valve 121 and a ball valve 122. When a vehicle is rotated by rollover from an ordinary position to positions of rotations of 90°, 180° and 270°, at least one of the ball valves 121 and 122 comes into contact with and fit the valve seats, so that the flow of the fuel from the fuel tank 107 to the internal combustion engine is completely shut off, as shown in FIGS. 19(a)–19(d).

Figures 20, 21:
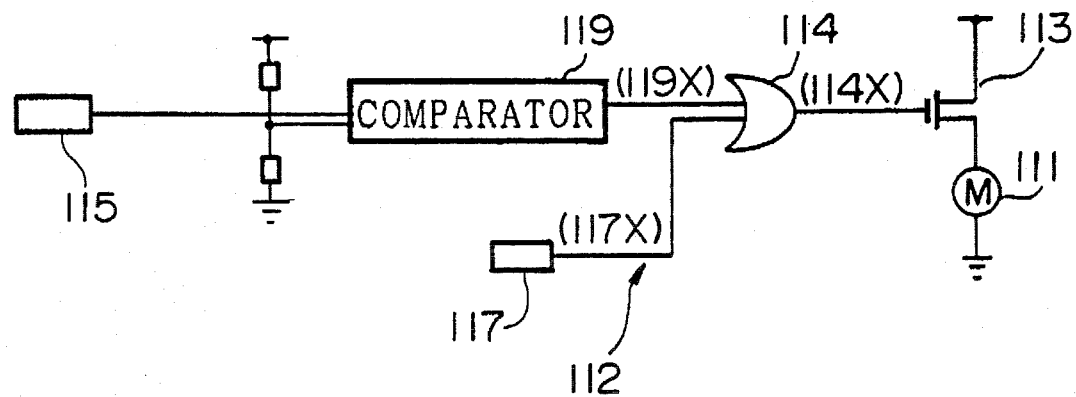
FIG. 20 is a table of truth value of a control means in another modification of the safety apparatus for a fuel tank according to the present invention.
FIG. 21 is a circuit diagram showing another example of a control means in another modification of the safety apparatus for a fuel tank according to the present invention.

Since a measure to shut off flow of the fuel from the fuel tank 1 to the internal combustion engine in the case of the vehicle rollover is used in the second modification, when only the tilt detection signal from the tilt sensor 116, which indicates rollover of the vehicle, is outputted from the sensors, the extraordinary tilt detection signal is neglected, as shown in FIG. 20. That is, in the second embodiment, when only the tilt detection signal which indicates rollover of the vehicle, is inputted from the tilt sensor 116 into the control unit 112, i.e., when only C is "1", the control is carried out so that the output (X) of OR gate (8) is "0" and not "1".

In the second embodiment, when only the tilt detection signal from the tilt sensor 116, which indicates rollover of the vehicle, is outputted from the sensors, the extraordinary tilt detection signal is neglected. However, the detecting means may not have the tilt sensor 116 itself, as shown in FIG. 21.

As explained above, in the present invention, the detecting means comprises a plurality of sensors such as a temperature sensor for detecting the temperature in the fuel tank, a crash sensor for detecting crash of the vehicle, or the like; and the controller outputs a drive signal to the supply system so as to supply the gelling agent into the fuel tank, under the condition that at least one of the plurality of sensors outputs a detection signal indicating an emergency in the vehicle. According to the control, it is possible to effectively cope with various emergency in the vehicle and to prevent occurrence of accidents.

In the above embodiments, the present invention is explained as a safety apparatus for a fuel tank in a vehicle. However, the safety apparatus for a fuel tank according to the present invention is not limited to this, it is possible to use the safety apparatus of the present invention for a fuel tank for a variety of uses.

What is claimed is:

1. A safety apparatus for a fuel tank in a vehicle comprising:

a fuel tank for storing fuel;

a gelling agent tank for storing a gelling agent which can gelatinize the fuel;

a supply system, connected between the gelling agent tank and the fuel tank, for supplying the gelling agent in the gelling agent tank to the fuel tank;

tank-emergency detecting means, coupled to the fuel tank, for detecting an emergency in the fuel tank and for outputting an emergency detection signal indicating said emergency;

a control means, coupled to the supply system and the tank emergency detecting system, for outputting a drive signal to drive the supply system;

wherein the control means outputs the drive signal under the condition that the tank-emergency detecting means outputs the emergency detection signal, wherein the tank-emergency detecting means comprises:

an optical fiber provided on one of the fuel tank and a component that is attached to the fuel tank, a light supply means, coupled to the optical fiber, for supplying a predetermined quantity of light to the optical fiber, and a light quantity detecting means, coupled to the optical fiber, for detecting the quantity of the light which was transmitted from the light supply means through the optical fiber;

wherein the emergency detecting means compares change of the quantity of the light which is transmitted through the optical fiber when no large external force is applied to the fuel tank to change of the quantity of the light which is transmitted through the optical fiber when a large external force is present on the fuel tank and detects an emergency in the fuel tank on the basis of the results of the comparison; and said safety apparatus further comprising a plurality of emergency detection means, including (1) a temperature-emergency detection means for detecting temperature in the fuel tank and outputting an emergency detection signal when the temperature in the fuel tank exceeds a predetermined threshold value of temperature; and (2) an acceleration-emergency detection means for detecting acceleration and outputting an emergency detection signal when the acceleration exceeds a predetermined threshold value of acceleration; and wherein the control means outputs the drive signal, under the condition that at least one of the plurality of emergency detection means outputs an emergency detection signal.

2. A safety apparatus for a fuel tank as claimed in claim 1, wherein the optical fiber has good flexibility and the transmission of the quantity of light transmitted therethrough changes according to external pressure applied to the optical fiber.

3. Safety apparatus for a fuel tank as claimed in claim 1, wherein the optical fiber is fixed onto the fuel tank by adhesion.

4. A safety apparatus for a fuel tank in a vehicle comprising:

a fuel tank for storing fuel;

a gelling agent tank for storing a gelling agent which can gelatinize the fuel;

a supply system, connected between the gelling agent tank and the fuel tank, for supplying the gelling agent in the gelling agent tank to the fuel tank;

tank-emergency detecting means, coupled to the fuel tank, for detecting an emergency in the fuel tank and for outputting an emergency detection signal indicating said emergency;

a control means, coupled to the supply system and the tank emergency detecting system, for outputting a drive signal to drive the supply system;

wherein the control means outputs the drive signal under the condition that the tank-emergency detecting means outputs the emergency detection signal, wherein the tank-emergency detecting means comprises:

an optical fiber provided on one of the fuel tank and a component that is attached to the fuel tank, a light supply means, coupled to the optical fiber, for supplying a predetermined quantity of light to the optical fiber, and a light quantity detecting means, coupled to the optical fiber, for detecting the quantity of the light which was transmitted from the light supply means through the optical fiber;

wherein the emergency detecting means compares change of the quantity of the light which is transmitted through the optical fiber when no large external force is applied to the fuel tank to change of the quantity of the light which is transmitted through the optical fiber when a large external force is present on the fuel tank and detects an emergency in the fuel tank on the basis of the results of the comparison and said safety apparatus further comprising a temperature-emergency detection means which detects the temperature in the fuel tank and outputs an emergency detection signal when the temperature in the fuel tank exceeds a predetermined threshold value of temperature;

an acceleration-emergency detection means which detects acceleration for a vehicle and which outputs an emergency detection signal when the acceleration of the vehicle exceeds a first predetermined threshold value of acceleration and outputs an emergency supplement signal when the acceleration of the vehicle exceeds a second predetermined threshold value of acceleration which is less than the first predetermined threshold value of acceleration;

a tilt-emergency detection means for detecting tilt angle of the vehicle and for outputting an emergency tendency signal when the tilt angle exceeds a predetermined threshold value of tilt angle; and wherein the light quantity detecting means (1) outputs an emergency detection signal when the ratio of the detected light quantity to the ordinary light quantity, which is one when the fuel tank receives substantially no large external forces, is less than a first predetermined threshold value of light quantity ratio, and (2) outputs an emergency supplemental signal when the ratio of the detected light quantity to the ordinary light quantity is less than the second predetermined threshold value of light quantity ratio but is more than the first predetermined threshold value of light quantity ratio; and wherein the control means (1) outputs the drive signal under the condition that at least one of the tank-emergency detection means, the temperature-emergency detection means, and the acceleration-emergency detection means outputs an emergency detection signal and (2) outputs the drive signal to the supply system, under the condition that at least one of the emergency supplement signal and the emergency tendency signal are outputted at the same time.

5. A safety apparatus for a fuel tank as claimed in claim 4, wherein the first predetermined threshold value of ratio of light quantity is about 0.2.

6. A safety apparatus for a fuel tank as claimed in claim 4, wherein the second predetermined threshold value of ratio of light quantity is about 0.9.

7. A safety apparatus for a fuel tank in a vehicle comprising:

a fuel tank for storing fuel;

a gelling agent tank for storing a gelling agent which can gelatinize the fuel;

a supply system, connected between the gelling agent tank and the fuel tank, for supplying the gelling agent in the gelling agent tank to the fuel tank;

tank-emergency detecting means, coupled to the fuel tank, for detecting an emergency in the fuel tank and for outputting an emergency detection signal indicating said emergency;

a control means, coupled to the supply system and the tank emergency detecting system, for outputting a drive signal to drive the supply system;

wherein the control means outputs the drive signal under the condition that the tank-emergency detecting means outputs the emergency detection signal, wherein the tank-emergency detecting means comprises:

an optical fiber provided on one of the fuel tank and a component that is attached to the fuel tank, a light supply means, coupled to the optical fiber, for supplying a predetermined quantity of light to the optical fiber, and a light quantity detecting means, coupled to the optical fiber, for detecting the quantity of the light which was transmitted from the light supply means through the optical fiber;

wherein the emergency detecting means compares change of the quantity of the light which is transmitted through the optical fiber when no large external force is applied to the fuel tank to change of the quantity of the light which is transmitted through the optical fiber when a large external force is present on the fuel tank and detects an emergency in the fuel tank on the basis of the results of the comparison; and wherein the supply system comprises:

a jetting means for jetting the gelling agent from the gelling agent tank into the fuel tank, a power supply circuit for providing power to the jetting means, and a switching means provided between the jetting means and the power supply circuit, for controlling the supply of driving power to the jetting means on the basis of the drive signal from the control means.

8. A safety apparatus for a fuel tank in a vehicle comprising:

a fuel tank for storing fuel;

a gelling agent tank for storing a gelling agent which can gelatinize the fuel;

a supply system, connected between the gelling agent tank and the fuel tank, for supplying the gelling agent in the gelling agent tank to the fuel tank;

tank-emergency detecting means, coupled to the fuel tank, for detecting an emergency in the fuel tank and for outputting an emergency detection signal indicating said emergency;

a control means, coupled to the supply system and the tank emergency detecting system, for outputting a drive signal to drive the supply system;

wherein the control means outputs the drive signal under the condition that the tank-emergency detecting means outputs the emergency detection signal, wherein the tank-emergency detecting means comprises:

an optical fiber provided on one of the fuel tank and a component that is attached to the fuel tank, a light supply means, coupled to the optical fiber, for supplying a predetermined quantity of light to the optical fiber, and a light quantity detecting means, coupled to the optical fiber, for detecting the quantity of the light which was transmitted from the light supply means through the optical fiber;

wherein the emergency detecting means compares change of the quantity of the light which is transmitted through the optical fiber when no large external force is applied to the fuel tank to change of the quantity of the light which is transmitted through the optical fiber when a large external force is present on the fuel tank and detects an emergency in the fuel tank on the basis of the results of the comparison;

wherein the light quantity detecting means comprises:

a photoelectric conversion element connected to the output terminal of the optical fiber, which converts the light quantity transmitted through the optical fiber to an electric current;

an amplifier for converting the electric current to an electric voltage;

an analog-to-digital converter for changing the electric voltage to a digital signal; and an operation part for operating an actual ratio of detected light quantity to the ordinary light quantity, for comparing the actual ratio with a previously stored threshold value of the ratio of detected light quantity to the ordinary light quantity, and for outputting the emergency detection signal to the control means through an output buffer when the actual ratio is less than the stored threshold value of the ratio.

9. A safety apparatus for a fuel tank in a vehicle comprising:

a fuel tank for storing fuel;

a gelling agent tank for storing a gelling agent which can gelatinize the fuel;

a supply system, connected between the gelling agent tank and the fuel tank, for supplying the gelling agent in the gelling agent tank to the fuel tank;

tank-emergency detecting means, coupled to the fuel tank, for detecting an emergency in the fuel tank and for outputting an emergency detection signal indicating said emergency;

a control means, coupled to the supply system and the tank emergency detecting system, for outputting a drive signal to drive the supply system;

wherein the control means outputs the drive signal under the condition that the tank-emergency detecting means outputs the emergency detection signal;

wherein the fuel tank has a wall surface, and wherein the emergency detecting means comprises an electrically conductive line member provided on the wall surface of the fuel tank, and judgement means for outputting the emergency detection signal when the conductive line member is disconnected;

a temperature-emergency detection means for detecting temperature in the fuel tank and for outputting an emergency detection signal when the temperature in the fuel tank exceeds a predetermined threshold value of temperature;

an acceleration-emergency detection means for detecting acceleration of the vehicle and for outputting an emergency detection signal when the acceleration of the vehicle exceeds a first predetermined threshold value of acceleration, and for outputting an emergency supplement signal when the acceleration of the vehicle exceeds a second predetermined threshold value of acceleration that is less than the first predetermined threshold value of acceleration; and a tilt-emergency detection means for detecting the tilt angle of the vehicle and for outputting an emergency tendency signal when the tilt angle exceeds a predetermined threshold value of tilt angle; and wherein the control means (1) outputs the drive signal, under the condition that at least one of the tank-emergency detection means, the temperature-emergency detection means, and the acceleration-emergency detection means outputs an emergency detection signal and (2) outputs the drive signal to the supply system, under the condition that both the emergency supplement signal and the emergency tendency signal are outputted at the same time.

10. A safety apparatus for a fuel tank in a vehicle comprising:

a fuel tank for storing fuel;

a gelling agent tank for storing a gelling agent which can gelatinize the fuel;

a supply system, connected between the gelling agent tank and the fuel tank, for supplying the gelling agent in the gelling agent tank to the fuel tank;

tank-emergency detecting means, coupled to the fuel tank, for detecting an emergency in the fuel tank and for outputting an emergency detection signal indicating said emergency;

a control means, coupled to the supply system and the tank emergency detecting system, for outputting a drive signal to drive the supply system;

wherein the control means outputs the drive signal under the condition that the tank-emergency detecting means outputs the emergency detection signal wherein the fuel tank has a wall surface, and the emergency detecting means comprises an electrically conductive line member provided on the wall surface of the fuel tank, and judgement means for outputting the emergency detection signal when the conductive line member is disconnected;

wherein the judgement means supplies a predetermined voltage to a first terminal of the electrically conductive line member, and judges whether or not the voltage of a second terminal of the conductive line member changes, and outputs the emergency detection signal when the voltage of the second terminal of the conductive line member changes.

11. A safety apparatus for a fuel tank as claimed in claim 10, wherein the judgement means comprises:

a voltage applying means for applying said predetermined voltage to the first terminal of the electrically conductive line member, and a comparator for comparing the voltage of the second terminal of the conductive line member with a reference voltage and outputting the emergency detection signal on the basis of the compared results.

* * * * *